(12) United States Patent
Korenblit et al.

(10) Patent No.: US 7,949,552 B2
(45) Date of Patent: May 24, 2011

(54) SYSTEMS AND METHODS FOR CONTEXT DRILLING IN WORKFORCE OPTIMIZATION

(75) Inventors: Shmuel Korenblit, San Mateo, CA (US); Simon Shvarts, Cupertino, CA (US); James Gordon Nies, Carmel, IN (US); Ari Volcoff, Campbell, CA (US)

(73) Assignee: Verint Americas Inc., Roswell, GA (US)

( * ) Notice: Subject to any disclaimer, the term of this patent is extended or adjusted under 35 U.S.C. 154(b) by 835 days.

(21) Appl. No.: 11/528,267

(22) Filed: Sep. 27, 2006

(65) Prior Publication Data
US 2007/0195944 A1    Aug. 23, 2007

Related U.S. Application Data

(63) Continuation-in-part of application No. 11/359,356, filed on Feb. 22, 2006.

(51) Int. Cl.
*G06Q 99/00* (2006.01)
(52) U.S. Cl. .......... 705/7; 705/11; 705/1; 379/265.11; 379/265.12
(58) Field of Classification Search .......... 705/7, 1, 705/11; 379/265
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |

(Continued)

FOREIGN PATENT DOCUMENTS

CA   2262044   10/1999

(Continued)

OTHER PUBLICATIONS

"Customer Spotlight: Navistar International," Web pae, unverified print date of Apr. 1, 2002.

(Continued)

*Primary Examiner* — Vanel Frenel
(74) *Attorney, Agent, or Firm* — Lawrence A. Aaronson, PC

(57) ABSTRACT

The systems and methods described herein provide a drill through engine that facilitates integration of solutions for performing workforce management, quality monitoring, e-learning, performance management, and analytics functionality. The drill through engine facilitates combining quality monitoring/call recording with performance management and e-learning functionality as a unified integrated solution. The combination can be delivered through a single platform and enables users to gain more insight and make smarter decisions faster about sales, service, and overall operations. This takes customer center tools beyond the traditional "suite" approach to a true single workforce optimization platform.

25 Claims, 22 Drawing Sheets

U.S. PATENT DOCUMENTS

| | | |
|---|---|---|
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,044,355 A | 3/2000 | Crockett et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,628,777 B1 | 9/2003 | McIlwaine et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,766,012 B1 | 7/2004 | Crossley |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,829 B1 * | 11/2005 | Leamon .......................... 705/9 |
| 7,092,509 B1 | 8/2006 | Mears et al. |
| 7,110,525 B1 * | 9/2006 | Heller et al. ............. 379/265.11 |
| 7,158,628 B2 | 1/2007 | McConnell et al. |
| 7,346,531 B2 | 3/2008 | Jacobs |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0049621 A1 * | 4/2002 | Bruce .............................. 705/7 |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2004/0249650 A1 | 12/2004 | Freedman et al. |
| 2005/0069119 A1 | 3/2005 | Erhart et al. |
| 2005/0138560 A1 | 6/2005 | Lee et al. |
| 2006/0062376 A1 | 3/2006 | Pickford |
| 2006/0089837 A1 * | 4/2006 | Adar et al. ..................... 705/1 |
| 2006/0239440 A1 | 10/2006 | Shaffer et al. |

FOREIGN PATENT DOCUMENTS

| EP | 0453128 A2 | 10/1991 |
|----|-----------|---------|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |
| WO | 2004090770 A1 | 10/2004 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3):17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.

Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle. *Will the Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC, PC* World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.
Quiggins et al ("A New approach to Contact Center Optimization," IEX Corporation, Jun. 21, 2004).
Gans et al ("Telephone Call Centers: Tutorial, Review, and Research Prospects," Manufacturing & Service Operations Management, vol. 5, No. 2, Spring, 2003, pp. 79-141, 1523-4614/03/0502/0079, 1526-5498 electronic ISSN).
Nathan Stearns, ("Applying Inbound Techniques To Outbound In Workforce Management. Customer Inter@ction Solutions"), Oct. 2005, 24(4), 52-55. Retrieved May 4, 1009, from ABI/INFORM Global database. (Document ID: 923689061).
Koole, Ger, Mandelbaum, Avishai, "Queueing Models of Call Centers: An Introduction," Annals of Operations Research, vol. 113, pp. 41-59, Jul. 2002, ISSN 0254-5330 (Print) 1572-9338 (Online).

\* cited by examiner

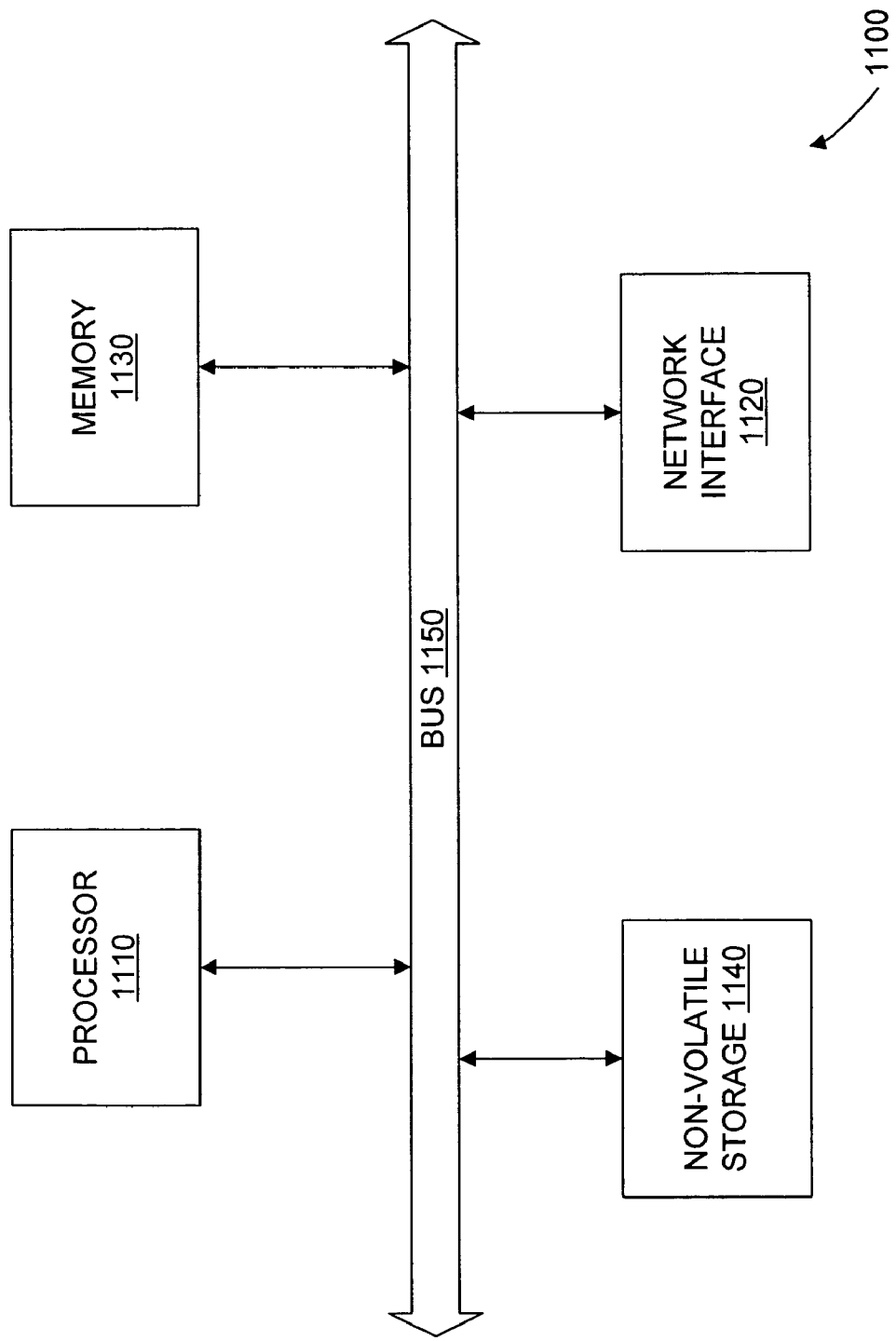

SYSTEMS AND METHODS FOR CONTEXT DRILLING IN WORKFORCE OPTIMIZATION

CROSS REFERENCE TO RELATED APPLICATION

The present application is a continuation-in-part of copending U.S. utility application entitled, "Systems and Methods for Workforce Optimization", having Ser. No. 11/359,356, filed Feb. 22, 2006, which is entirely incorporated herein by reference.

FIELD OF THE DISCLOSURE

The present disclosure relates to root cause analysis within customer centers.

BACKGROUND

The business of a call center, also known as a customer center, is to provide rapid and efficient interaction between agents and customers (or prospective customers). Conventional customer center systems determine if agents are being productive and meeting customer center targets (called "adherence") by tracking phone usage of agents. In addition to talking to a customer on the phone, such an agent usually spends time using a PC or workstation application that runs, for example, a customer relationship manager (CRM) and a customer account database, among others. The proficiency of an agent on these applications therefore impacts overall customer center productivity. However, conventional customer center systems do not utilize information about application usage when providing adherence information.

Today's customer centers often support various interaction methods and media, including phone, e-mail, video conferencing, and messaging applications. Customer center systems typically allow some or all of these interactions to be recorded. The recordings may be reviewed later for compliance with business or government regulations, or for quality assurance. These systems also allow a supervisor to monitor interactions, typically to determine if an agent is adhering to customer center policies.

In conventional customer center systems, the playback of recorded interactions and live monitoring of interactions occurs in an "interactions" application, sometimes known as a "contacts" application. A separate "schedule adherence" application is used to compare agents' scheduled activities with agents' actual activities and to provide information about adherence exceptions to the scheduled activities.

SUMMARY

Systems and methods are disclosed for a context drilling process for optimizing operations at, for example, a customer center. In one embodiment, the process comprises the steps of: monitoring for an occurrence of an exception to agent adherence, the agent adherence being determined from agent activities at the customer center; associating the exception to the agent adherence with the agent activity at the customer center; associating the exception to a drill through option; and responsive to selecting the drill through option, providing information indicating that the agent activity, which is the root cause of the exception to the agent adherence.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 11 is a block diagram of a general-purpose computer that can be used to implement one or more of the components of the integrated customer center systems, processes or methods;

DETAILED DESCRIPTION

Figure 1:
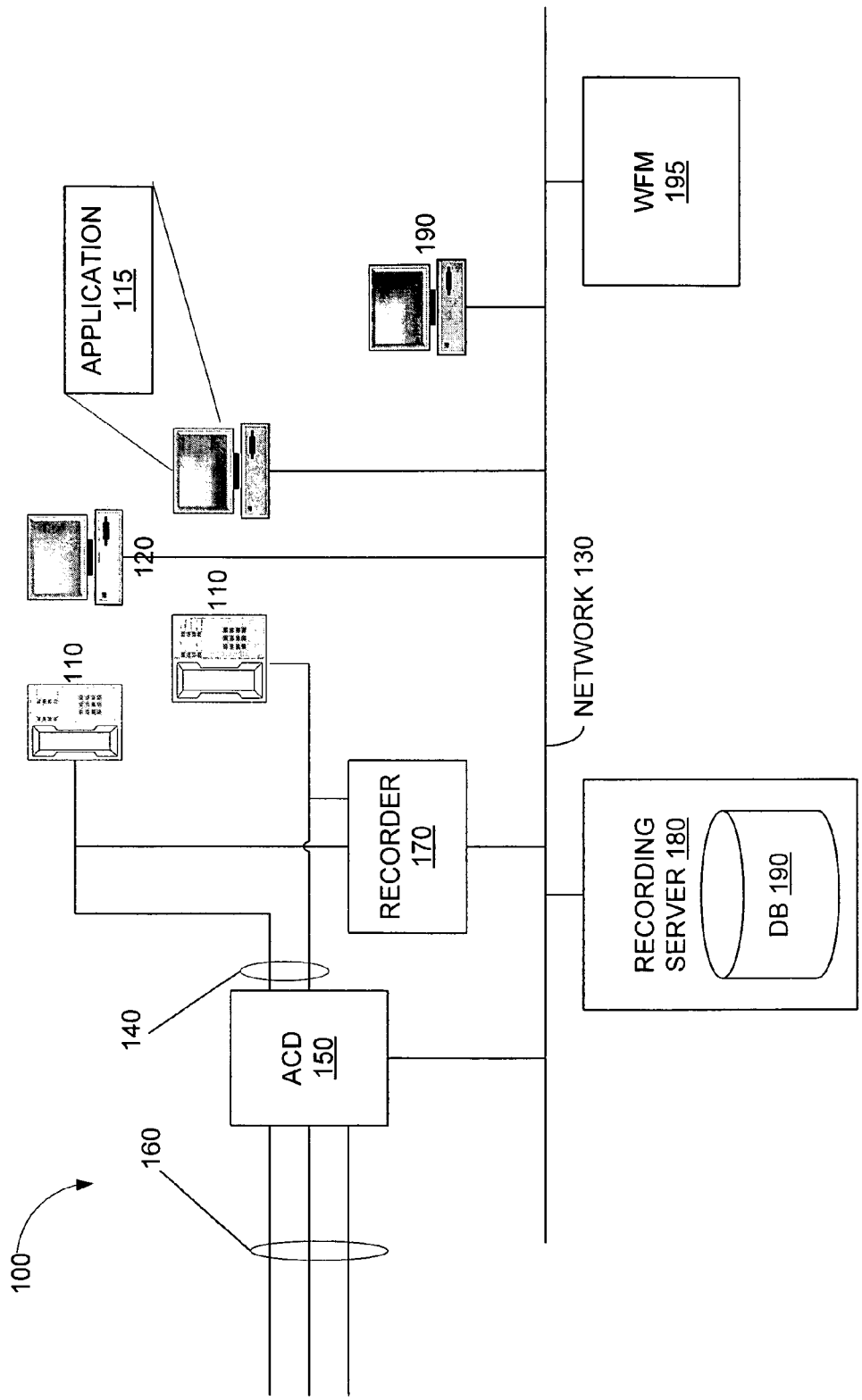
FIG. 1 is a block diagram of a customer center environment.

Customer center includes, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

Disclosed herein is a system and method for context drilling in workforce optimization. For example, a user can be shown on a display device a summary of various categories of agent quality monitoring. Each summary can include a drill through option that allows the user to find more information about the summary of the various categories. The drill through option obtains the information through the workforce optimization platform that integrates the following: 1) Quality Monitoring/Call Recording—voice of the customer; the complete customer experience across multimedia touch points; 2) Workforce Management—strategic forecasting and scheduling that drives efficiency and adherence, aids in planning, and helps facilitate optimum staffing and service levels; 3) Performance Management—key performance indicators (KPIs) and scorecards that analyze and help identify synergies, opportunities and improvement areas; 4) e-Learning—training, new information and protocol disseminated to staff, leverage best practice customer interactions and deliver learning to support development; and/or 5) Analytics—deliver insights from customer interactions to drive business performance. The five segments, among others, can become part of an interwoven and interoperable solution, enabling customer centers to transition from reactive cost centers to proactive, information-rich departments that deliver strategic value to the organization.

Further, the integrated workforce optimization platforms disclosed herein provide closed-loop systems for continuous performance improvement, enabling customer centers to: establish realistic forecasts and performance goals; schedule and deploy the right number of staff with the appropriate skills; capture customer interactions in their entirety by recording all calls, or recording based on business rules, or on-demand, or randomly; measure performance to identify execution issues and excellence; analyze customer interactions to investigate opportunities for optimizing use of people, processes and technologies; take action by delivering targeted training or re-engineering processes; and/or refine forecasts and performance goals based on the collected data.

One embodiment of the integrated process and system disclosed herein begins with planning and establishing goals—from both an enterprise and center perspective—to ensure alignment and objectives that complement and support one another. Next comes forecasting and scheduling of the workforce to ensure optimum service levels. Then recording and measuring performance are utilized, leveraging quality monitoring/call recording to assess service quality and the customer experience.

Next, the process/system analyzes and identifies opportunities and correlates them with customer center or organization's KPIs and scorecards. Then, e-learning and company-specific "best practices" (documented through captured customer interactions) make it possible to address skill and knowledge gaps efficiently and effectively—as well as quickly communicate policy or procedural changes across the center—enabling the customer center to achieve success in whatever terms it chooses to define. Rather than arbitrarily sending e-learning training segments and hoping agents use them, customer centers can use advanced workforce management forecasting and scheduling to select the best time to administer training (which is proven to be more effective than classroom or group learning) as well as freeing the supervisors from working one-on-one with agents.

Quality monitoring scores, including insights from analytics and/or analytical analysis of structured, unstructured, or aggregated data, can next be fed into a workforce management to produce staffing models that prevent companies from unknowingly scheduling one shift with all the top performers, for example. As a result, some embodiments of the workforce management component of the process/system of the present disclosure can provide a higher level of consistent service across shifts.

As can be seen, while each technology segment delivers value, integration of the segments delivers greater impact than the sum of their individual parts. Utilizing them separately limits the customer center's potential to become a strategic business asset.

The integrated systems for workforce optimization disclosed herein potentially solve many deficiencies in today's maturing customer center industry. For instance, at an operational level, centers are focused on optimizing customer sales/service representative (CSR) performance. In the process, centers may be working under constraints, such as cost control and infrastructures that provide only bare essentials. They may also face the challenge of matching demand with resources, retaining effective agents, prioritizing coaching/training, and delivering consistent customer experiences. Leveraging an integrated system and its components, such as forecasting and scheduling, voice/screen capture/recording, evaluations and best practice training, enables them to focus on reducing risk, decreasing average handle time, improving quality scores, driving down average time to answer, ensuring adherence and managing occupancy.

At a more advanced level, customer centers are focused on optimizing customer center performance. They face the challenge of balancing productivity with quality, increasing center-driven revenue, standardizing service across touch points, and growing transaction complexities. Customer centers are examining such metrics as first call resolution, shrinkage, up-selling and cross-selling, and customer satisfaction as driven through the customer center. As disclosed herein, the forecasting and scheduling, adherence, business rules-driven recording, lesson management, agent/organizational scorecard functionality and drill through engine—for example—unite customer center experiences, provide flexible scheduling, and promote the initiation of a performance improvement culture.

The subject matter disclosed herein is related to the subject matter disclosed in several pending U.S. patent applications. One is entitled "Systems and Methods for Managing Recorders from a Central Point of Administration," filed on Feb. 22, 2006, assigned Ser. No. 11/359,325, and entirely incorporated by reference herein. The subject matter of the 1180 application is centralized administration of voice, video, and data recorders, and enabling role-based access control of recorders which do not have role-based security concepts.

Another is "Systems and Methods for Scheduling Call Center Agents Using Quality Data and Correlation-Based Discovery," filed on Feb. 22, 2006, assigned Ser. No. 11/359,909, and entirely incorporated by reference herein.

Another is "Systems and Methods for Scheduling Call Center Agents Using Quality Data and Correlation-Based Discovery," filed on Feb. 22, 2006, assigned Ser. No. 11/359,731, and entirely incorporated by reference herein.

Another is "System and Method for Integrating Learning Systems and Scorecards Systems", filed on Feb. 22, 2006, assigned Ser. No. 11/359,359, and entirely incorporated by reference herein.

Another is "System and Method for Integrating Learning Systems and Workforce Management Systems", filed on Feb. 22, 2006, assigned Ser. No. 11,359,194, and entirely incorporated by reference herein.

Another is U.S. application Ser. No. 10/136,705, entitled "Method and System for Presenting Events Associated with Recorded Data Exchanged between a Server and a User," filed on Apr. 30, 2002, and entirely incorporated by reference herein. The subject matter of the '705 application includes capturing and graphically displaying events that occur during an interaction between a customer and an agent. A reviewer is presented with a summarized voice interaction session, in the form of a call timeline, including a list of event identifiers. The reviewer selects one of the event identifiers in the timeline, and the interaction session, starting with the selected event, is presented to the user. The user could choose to start listening to the exchange at an event by selecting the event.

Another is U.S. application Ser. No. 10/137,480, entitled "Method and System for Selectively Dedicating Resources for Recording Data Exchanged between Entities Attached to a Network," filed on Apr. 30, 2002, and entirely incorporated by reference herein. The subject matter of the '480 application includes determining whether to use an active tap or a passive tap to record data passing through a particular node based upon an objective for recording as noted by predefined business rules.

Another is U.S. application Ser. No. 10/136,735, entitled "Methods and Systems for Categorizing and Cataloguing Recorded Interactions," filed on Apr. 30, 2002, and entirely incorporated by reference herein. The subject matter of the '735 application includes categorizing data upon storing the captured data. The categories are based upon predefined business rules for storing captured data.

Another is U.S. application Ser. No. 10/061,469, entitled "Method, Apparatus, and System for Capturing Data Exchanged between a Server and a User," filed on Jan. 21, 2002, and entirely incorporated by reference herein. The subject matter of the '469 application includes capture of exchange data by a capture module that operates independently from the server and the user.

Another is U.S. application Ser. No. 10/061,489, entitled "Method, Apparatus, and System for Processing Data Captured during Exchanges between a Server and a User," filed on Jan. 31, 2002, and entirely incorporated by reference herein. The subject matter of the '489 application includes selective recordation of captured data based upon whether the data satisfies predetermined business rules.

Another is U.S. application Ser. No. 10/061,491, entitled "Method, Apparatus, and System for Replaying Data Selected from Among Data Captured During Exchanges Between a Server and a User," filed on Jan. 21, 2002, and entirely incorporated by reference herein. The subject matter of the '491 application includes replaying data captured during a session, wherein search criteria are based upon business rules.

The following is a list of other U.S. utility applications which include related subject matter, each of which is incorporated by reference: U.S. utility application, entitled, "Method and Apparatus for Long-Range Planning," having Ser. No. 09/899,895, filed on Oct. 3, 2002; U.S. utility application entitled, "Interface System and Method of Building Rules and Constraints For a Resource Scheduling System," having Ser. No. 09/680,131, filed on Oct. 2, 2000; U.S. Utility Application entitled, "System and Method for Complex Schedule Generation," having Ser. No. 09/825,589, filed on Apr. 3, 2001; U.S. utility application entitled, "Method and Apparatus for Long-Range Planning," having Ser. No. 09/899,895, filed on Jul. 5, 2001; U.S. utility application entitled, "Method and Apparatus for Multi-Contact Scheduling," having Ser. No. 11/037,604, filed on Jan. 18, 2005; and U.S. Utility application entitled, "Method and Apparatus for Concurrent Error Identification in Resource Scheduling," having Ser. No. 11/237,456, filed on Sep. 9, 2005.

FIG. 1 is a block diagram of an embodiment of a customer center environment 100. The customer center 100 is staffed by agents who handle incoming and/or outgoing phone calls. An agent workspace ("position") includes an agent phone 110 ("station") and a workstation computer 120. A network 130 connects one or more of the agent workstations 120 to other call system components. Each agent phone 110 is connected by a trunk line 140 to an automatic call distributor (ACD) 150. Although shown as separate devices, the phone 110 may be integrated into the workstation 120. In this case (called a "soft phone"), the agent controls telephony functions through the workstation 120.

When an agent is ready to receive calls at his phone, the agent first logs into the ACD 150. This login notifies the ACD 150 that the agent is available to take calls. An agent's ACD state changes throughout the workday, as the agent takes calls, performs after-call work, takes breaks, etc. An example list of ACD states includes available, busy, after-call work, and unavailable, among others.

The ACD 150 distributes incoming phone calls to available agents. A phone call comes into the customer center 100 on an outside trunk 160. If an agent is not available, the ACD 150 puts the call into a queue, which effectively places the caller on hold. When an agent is available, the ACD 150 connects the outside trunk line 160 carrying the phone call to one of the agents. More specifically, the ACD 150 connects the outside trunk line 160 to the trunk line 140 of the selected agent.

A call recorder 170, connected to one or more of the agent trunk lines 140, provides call recording capabilities. In a typical customer center, such as that shown in FIG. 1, the recorder 170 is a server with specialized hardware (e.g., digital signal processing boards). The recorder 170 receives instructions from a recording server 180. The recording server 180 maintains an interaction database 190 which stores the recorded content as well as descriptive information about the recording. The recording server 180 provides an interface for searching the interaction database 190.

While on a call with a customer, the agent interacts with one or more applications 115 running on the workstation 120. Examples are applications that give the agent access to customer records, product information, ordering status, and transaction history, among others. The applications may access one or more enterprise databases (not shown) via the network 130.

The customer center 100 also includes a work force manager (WFM) 195, which is typically divided among several applications. The WFM 195 comprises the suite of applications. Many of the WFM components have a user interface, which runs on a supervisor workstation 120.

The WFM 195 performs many functions. One such function, among others, is calculating staffing levels and agent schedules, based on historical patterns of incoming calls. Another function of the WFM 195, among others, is collecting customer center contact statistics and providing this information, both historical and real-time, to the customer center supervisor or manager. Yet another function of the WFM 195, among others, is supplying the supervisor with information on how well each agent complies with customer center policies. The portion of the WFM 195 that performs this last function is the adherence subsystem.

In general terms, the function of the adherence subsystem is to determine whether agent activities comply with ("adhere to") customer center policies. An instance where an agent activity does not adhere to a policy is an "exception." An adherence subsystem may support different levels of adherence, where policies are defined, and agent activities are captured with different amounts of detail.

For example, the policy used in a low-level form of adherence might be a schedule. For example, an agent is expected to be working the phone from 10 AM to 11 AM and e-mail from 11 AM to 12 PM. Information about calls or emails handled by an agent is not relevant to this first form of adherence. In contrast, in a higher-level form of adherence, policy includes quality targets. For example, an agent is expected to have a call duration of less than 5 minutes.

The business purpose of a customer center is to provide rapid and efficient interaction between agents and customers. To achieve this purpose, a customer center follows a business process having states, in that one state affects subsequent states. An example of the states is described in relation to FIG. 2.

In a conventional customer center business process, there is a relatively high degree of separation between states. In contrast, in the integrated customer center business process 200 (FIG. 2) described here, multiple states are connected into a loop, with each state of the process feeding input into another state down the line.

Figure 2:
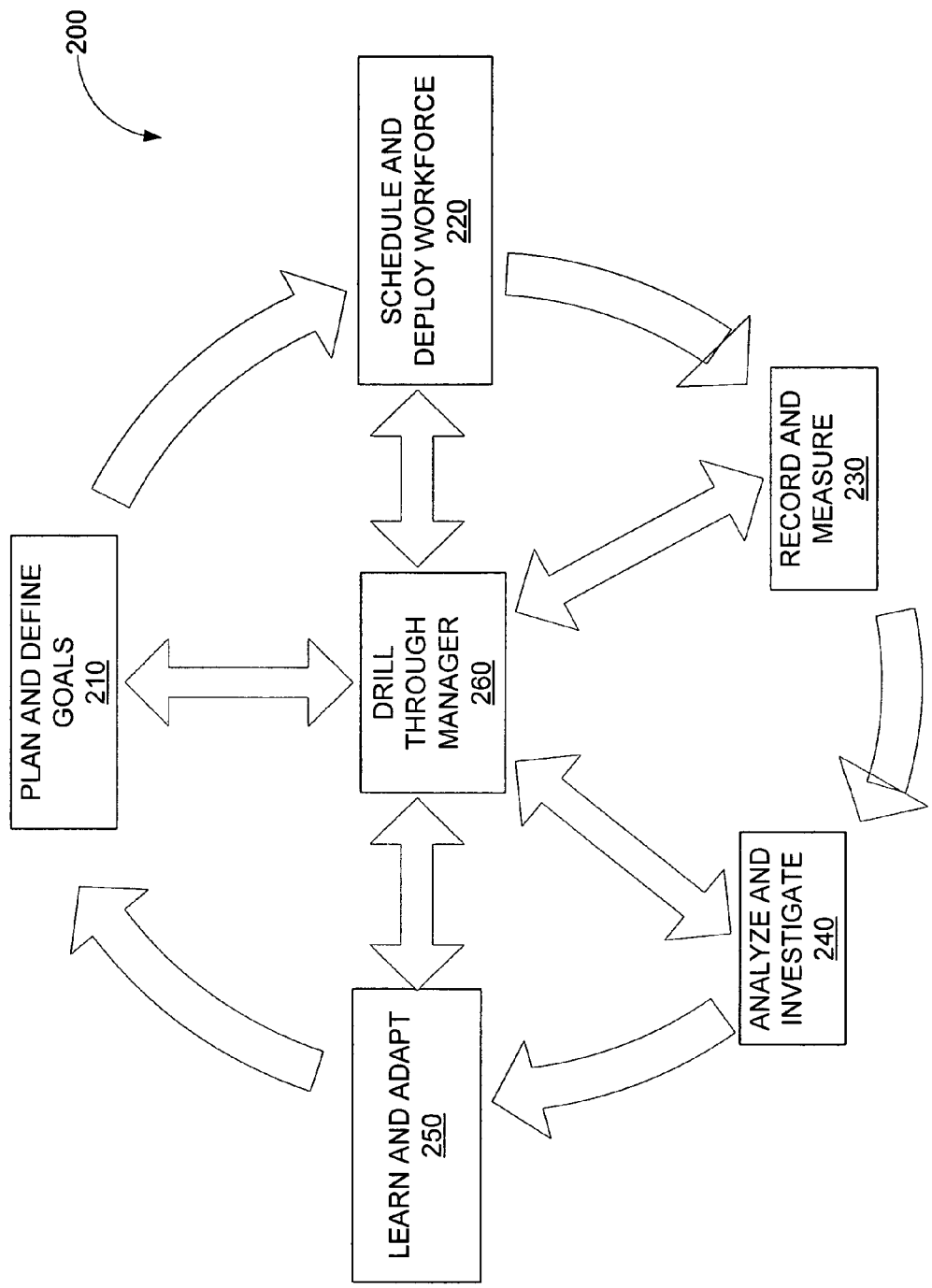
FIG. 2 is a diagram of an embodiment of an integrated process for optimizing operations at a customer center.

FIG. 2 is a diagram of an embodiment of the integrated process for optimizing operations at a customer center 200, in which several interfaced organizations are combined as a single integrated operational process and/or platform. In the first state 210, the business goals of the customer center are defined. Goals are defined in terms of metrics that describe how the customer center is expected to perform. Some metrics relate to expected revenue, such as revenue/hour or revenue/agent. Other metrics relate to service level, such as time-to-answer and rate of first-call resolution. Persons familiar with customer center operations should understand these and many other business goals and metrics.

The first state 210 may also include campaign planning. Profiles for campaigns are defined, for example by inbound or outbound; how many contacts are expected; date and duration of the campaign; and what sorts of agent skills are needed.

Information about the goals and campaign(s) produced by the first state 210 is provided to the second state 220 and sixth state 260. The sixth state 260 receives the information about the goals and campaign(s) from the first state 210 and track information indicating whether the goals and campaign(s) are achieved. The sixth state 260 enables users to drill through information related to the goals and campaign(s).

In the second state 220, a workforce of agents is scheduled to staff the campaign(s). In determining the number of agents scheduled for a campaign, the goals/metrics and campaign characteristics from the first state 210 are considered. The schedule is also used as input of a workload forecast, which predicts contact volume during each interval of the campaign, based on historical data. Using this schedule, the customer center manager deploys the appropriate number and mix of agents during the campaign times.

The sixth state 260 receives the information about the number of agents scheduled for the campaign from the second state 220 and tracks information indicating whether the number of agents scheduled for the campaign is achieved. The sixth state 260 enables the users to drill through information related to the number of agents scheduled for the campaign. In this regard, "drill through" means providing a link that accesses the desired information.

The output of the second state 220 is the customer-agent interactions that occur during a campaign. The third state 230 measures or assesses the interactions in various ways. One typical assessment ("adherence") measures how well an agent complied with customer center policies (e.g., call duration). In the third state 230, at least a portion of the interactions are recorded and then examined. This examination produces a variety of quality metrics that assess an agent's skills in various categories (product knowledge, selling, listening, etc.)

The sixth state 260 receives the information about various measurements, assessments, recordings, and examinations from the third state 230 and tracks information indicating whether the various assessments indicate that the agent complied with the customer center policies. The sixth state 260 enables the users to drill through information related to the customer center policies that were achieved or not based on the various assessments.

The various assessments are provided as input to the fourth state (240). In this state, these inputs are analyzed in various ways. The analysis may rate interactions on a "good" to "bad" scale, considering the customer point of view, the business point-of-view, or both. For example, a contact that resulted in a sale would be an indicator of a "good" interaction while a contact that exceeded average duration would be an indicator of a "bad" interaction.

Once "bad" interactions are identified, an attempt is made to determine a root cause. In some cases, the root cause may lie with an agent (e.g., weak product skills). In other cases, the cause may be in the customer center infrastructure or operations (e.g., customer database is slow). The cause might also be rooted in a business process of the enterprise that is sponsoring the campaign. For example, the billing process used by the enterprise, or the process by which the enterprise dispatches field service units could be the cause.

The sixth state 260 receives the information about the analysis of the interaction from the fourth state 240 and tracks information indicating whether the analysis of the interaction is "bad" or "good". The sixth state 260 enables the users to drill through information related to the analysis of the interaction that was "bad" or "good".

The fifth state 250 uses the analysis produced by the fourth state 230 to adapt and change operations accordingly. Agent skills can be improved by training in the deficient areas. The information may be used to change an aspect of customer center operations, or to make a recommendation to the sponsoring enterprise for it to change its processes or operations. The results of the analysis, as well as the raw metrics used as input to the analysis, are combined into data sets ("scorecards") that allow the customer center operators to determine whether or not the business goals are met and whether the metrics show progress toward the goals or away from the goal ("trending"). These data sets are provided as input to the first state 210, which closes the feedback loop of the integrated customer center business process 200.

The fifth state 250 can provide the scorecards to the agents and customer center operators. The fifth state 250 can notify the agents that changes have been made to a particular customer center operations because the customer center did not meet business goals or are not progressing toward the goals. In general, the sixth state 260 obtains information from the five states 210, 220, 230, 240, 250 and tracks information indicating whether the states accomplished their intended purposes. The sixth state 260 provides the user with the root cause of those states that did not accomplish their intended purposes, which are further described in the following FIGs.

Figure 3:
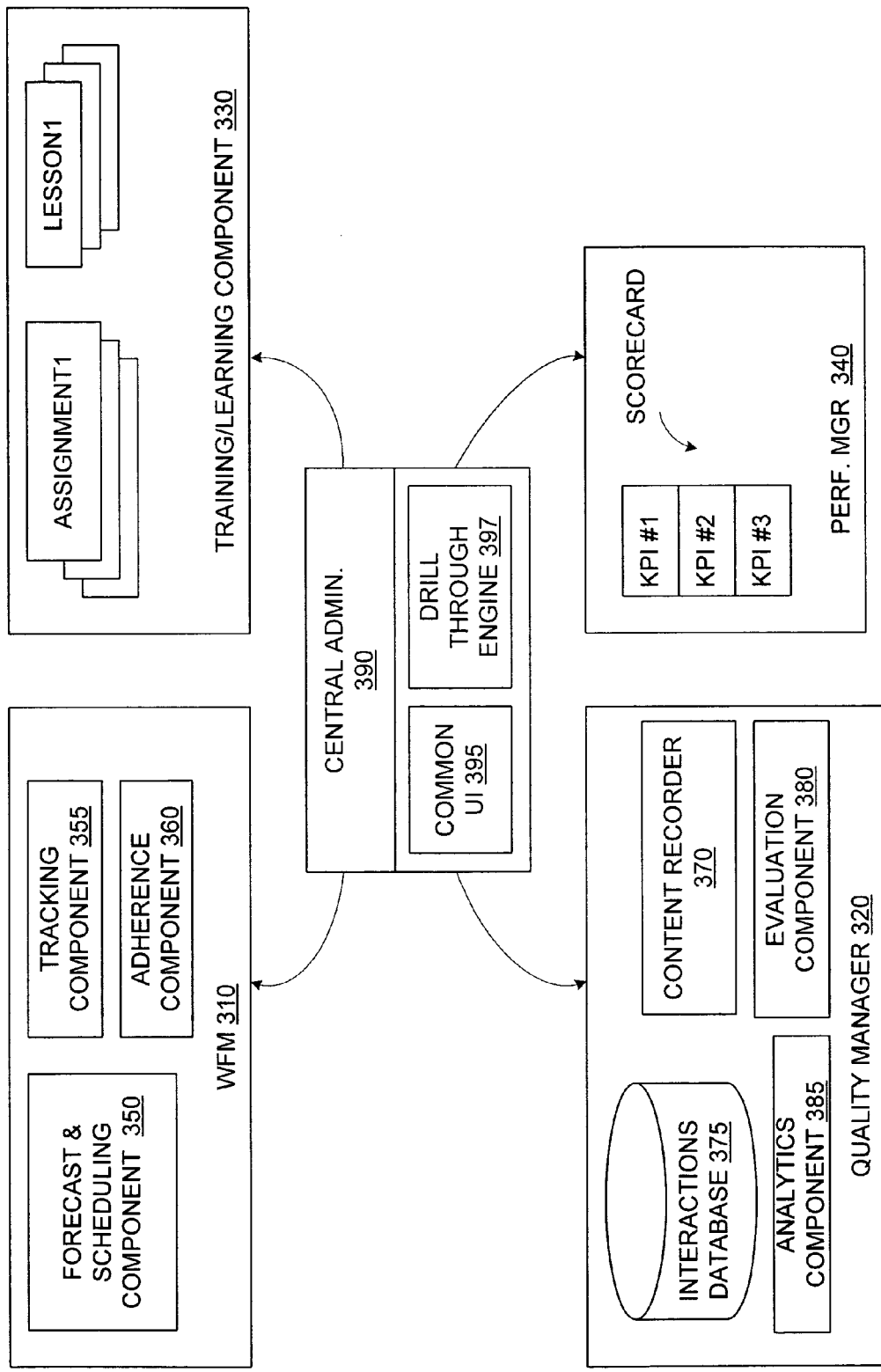
FIG. 3 is a high-level view of components in an embodiment of an integrated customer center system that includes a drill through engine.

FIG. 3 is a high-level view of components in an embodiment of an integrated customer center system 300. The integrated system 300 includes two or more of the following components: a work force manager (WFM) 310; a quality monitoring component 320; a learning component 330; and a performance management component 340. These components 310, 320, 330, 340 cooperate to implement the integrated customer center business process 200 as described earlier.

As will be described, combining agent quality metrics from the quality monitor 320 (e.g., synchronous such as voice, asynchronous such as e-mail or chat) with WFM 320 (e.g., agent planning, scheduling) can provide insight that customer center supervisors can use to confirm the value provided by agents to the business as a whole.

The WFM 310 performs many functions related to the agent workforce. For example, WFM 310 can: schedule single, multiple, or virtual customer centers across multiple time zones; accommodate a dedicated, blended, or task-switching environment; schedule meetings or training without impact on service levels; allow agents to bid for shifts and provide input into their schedules; automate compliance with government and union regulations; create centralized forecasts and schedules with a single point of control over the entire network, or decentralized schedules that allow for decision-making at individual sites; schedule based on skill priorities that align with the customer center's routing strategy; and create and schedule teams as a unit to support training and accommodate employee preferences.

The functionality of the WFM 310 is typically divided among several applications, executables, processes, or services. A forecast and scheduling component 350 calculates staffing levels and agent schedules based on historical interaction (contact) patterns. A tracking component 355 provides a customer center supervisor or manager with information about agent activities and agent-customer interactions, both historical and real-time. An adherence component 360 supplies the supervisor with information on how well each agent complies with call center policies. For example, once schedules are created, the customer center should ensure that agents follow the schedules.

Most preferably, the adherence component 360 provides a real-time view of every activity across each channel in the customer center, including those in the front and back office, so supervisors/customer centers can see how their staff spends its time. In an enhancement, alerts can be set to notify supervisors when agents are out-of-adherence and exception management can help ensure agents are correctly recognized for work they have performed.

The quality monitor 320 includes a content recorder 370 for recording agent-customer interactions. The content recorder 370 can be configured to capture all interactions, or a selected set of interactions based on user-defined business rules.

The content recorder 370 can capture voice and data interactions from both traditional and IP telephony environments and can handle high-volume recording for compliance and sales verification. The content recorder 370 can also record all voice transactions across multiple sites, or randomly capture a subset of transactions that may be of particular interest, as well as record contacts on-demand. Using the content recorder 370 a user can record all contacts or establish advanced business rules to capture only those transactions of particular interest. User-defined business rules can trigger the recordings, initiate enterprise collaboration by notifying individuals or groups of the captured contacts and emerging trends, and allow users to assign attributes or "tags" to the contacts for quick identification. All data related to a customer interaction—including navigation of automated systems, agent keystrokes and desktop activities can be stored automatically in folders for search and retrieval. Different users in an enterprise can share and review transactions, as well as hear customer feedback first-hand.

The quality manager 320 stores the interactions in an interactions database 375, which may include descriptive information as well as recorded content. Customer center personnel play back some of the interactions and use an evaluation component 380 to score the agent in various categories (product knowledge, selling, listening, etc.)

Furthermore, customer center supervisors and quality analysts can then tap into these recorded interactions to review, evaluate, and score agent performance. An analytics component 385 can analyze interactions in various ways, including the use of speech analytics. Examples of analysis include categorizing calls based on content, analyzing a call against an expected call pattern and reporting exceptions to the pattern, and providing a visualization layer for recorded interactions that displays other data attributes such as agent activities coincident with call events.

The learning component 330 allows a customer center manager to develop training lessons for agents and assign lessons to agents. The learning component 330 provides automated training processes by identifying, scheduling, and delivering online learning directly to agent desktops. The lesson content can include recorded interactions, which can be used to create a library of best practices for training agents and other personnel. Using actual interactions, a customer center can develop E-learning content specific to the organization. In an enhancement, these training lessons can include assessments to help track and measure agent performance, skill acquisition, and knowledge retention.

The learning component 330 can also deliver targeted learning sessions over a network, using e-mail, or a hyperlink to a Web site, or directly to the agent desktop. Supervisors can select the appropriate training sessions from a library of courseware or create sessions themselves using a contact editing feature. Then supervisors can assign course material and monitor completion automatically.

The performance manager 340 displays key performance indicators. (KPIs), which can be predefined on a scorecard. The scorecard, which can be role-appropriate, provides a statistical measure of how well an agent or group of agents is performing (against their goals). The KPI metrics are derived from quality evaluations and/or WFM call routing data.

A centralized administration component 390 consolidates agent administration across the various components into a single point of entry, and provides a single logon to all components for agents and administrators. The administration component 390 may also include a centralized reporting component, even across multiple sites. A common user interface 395 reduces training time on the various system components.

A drill through engine 397 monitors, but is not limited to, the WFM 310, quality manager 320, learning component 330 training and performance manager 340, for example, to determine whether each component of the integrated customer center system 300 performs its business rules or goals. If any of the business rules are not met, the drill through engine 397 enables the users to drill through information related to the respective components.

The drill through engine 397 can be deployed within a centralized administration component 390, within a company premises, distributed across multiple geographic locations, and/or embedded into a network as a service on a network infrastructure. The drill through engine can be accessed through links from any components of the integrated customer center system, generally via a link on a user interface.

An integrated customer center system such as system 300 allows customer center analysts to quickly access the right information. Such an integrated system allows valuable and previously undiscovered information to be uncovered. This new level of visibility into customer center operations should allow personnel to make better decisions faster.

Figure 4:
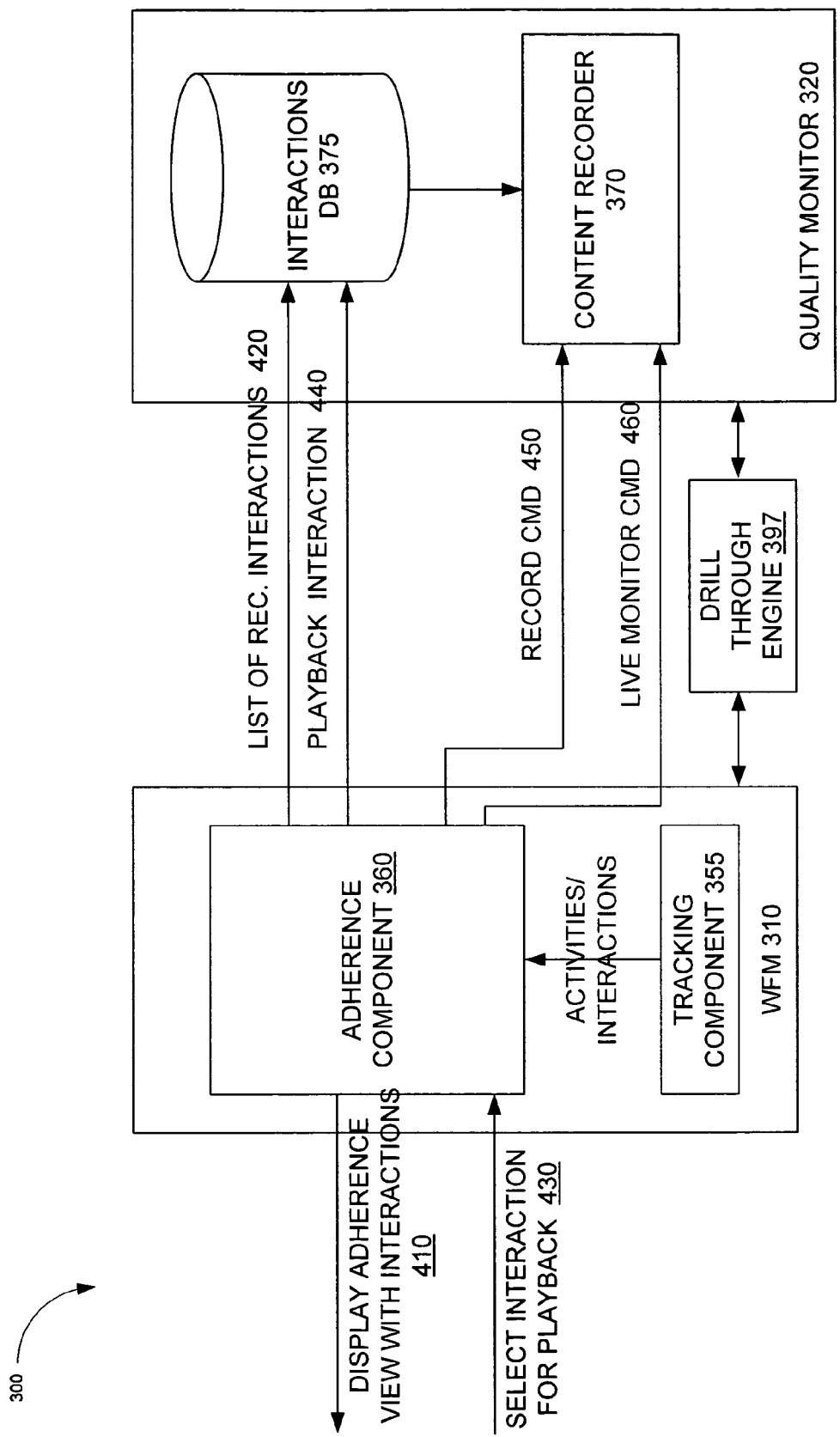
FIG. 4 shows a point of integration between a work force manager (WFM) and a quality monitor, such as that shown in FIG. 3.

FIG. 4 shows a point of integration between two components of the integrated customer center system 300, the WFM 310 and the quality monitor 320. Conventional call center systems provide an "interactions" application that allows playback of recorded interactions and live monitoring of interactions. These conventional systems did not integrate interactions with WFM adherence information. The integration between the WFM 310 and the quality monitor 320 described in FIG. 4 allows a supervisor to "drill through" and examine a particular recorded interaction from a display of agent activity and/or adherence information.

In this disclosure, the term "interaction" refers to a record of the content of agent activities related to a call. Note that agent activities are not limited to audio of the call itself. Other forms of media are included. Examples of other types of interactions are: video recording of the agent; application activity on the agent's workstation 120; web pages delivered to the agent and/or customer during collaborative sessions; messages delivered through e-mail, instant messaging, or other messaging technologies. Also, the agent activities in an interaction are not limited to the duration of the call, but can occur after the call (a state called "wrap up" or "research").

The tracking component 355 of the WFM 310 provides information about agent activities to the WFM adherence component 360. Agent activities, which describe work activities performed by agents, are collected from various sources. The call router 140 (FIG. 1) reports agent call states (Available, After-Call-Work, etc.) A monitoring application on agent workstations 120 tracks agent activity on the workstation (e.g., switching between applications, screen data, keyboard input, etc.). The drill through engine 397 communicates with the tracking component 355 to provide information indicating the root cause of the agent's exception to adherence.

The adherence component 360 displays a view 410 of agent activities, typically one agent per line, with activities arranged across a timeline. Exceptions to agent adherence (e.g., non-compliance with customer center policy) are provided to the drill through engine 397, which can display the exceptions in conjunction with the activities and the timeline. The adherence component 360 obtains a list 420 of recorded interactions available for agents during the displayed time period. This list of interactions is presented to the user in the same adherence view 410. The drill through engine 397 can associate and provide the agent activities that correspond to the exception to the agent adherence. Operation of the drill through engine 397 at the integration point between the WFM 310 and the quality monitor 320 is described in relation to FIG. 13.

From the adherence view, a user can "drill through" to a recorded interaction by selecting 430 the interaction from the list, and then activating a playback tool. The adherence component 360 retrieves 440 the selected interaction from the interactions database 375, and the interaction is then played back using an appropriate application (e.g., media player, desktop activity player, web content player). A user can also select an agent activity that is presently occurring and either record-on-demand 450 or live monitor 460 the selected activity.

Integration between the WFM 310 and the quality monitor 320 is further described in the U.S. patent application "System and Method for Integrated Display of Recorded Interactions and Call Agent Data," assigned Ser. No. 11/359,357, filed on Feb. 22, 2006, and entirely incorporated by reference herein.

Figure 5:
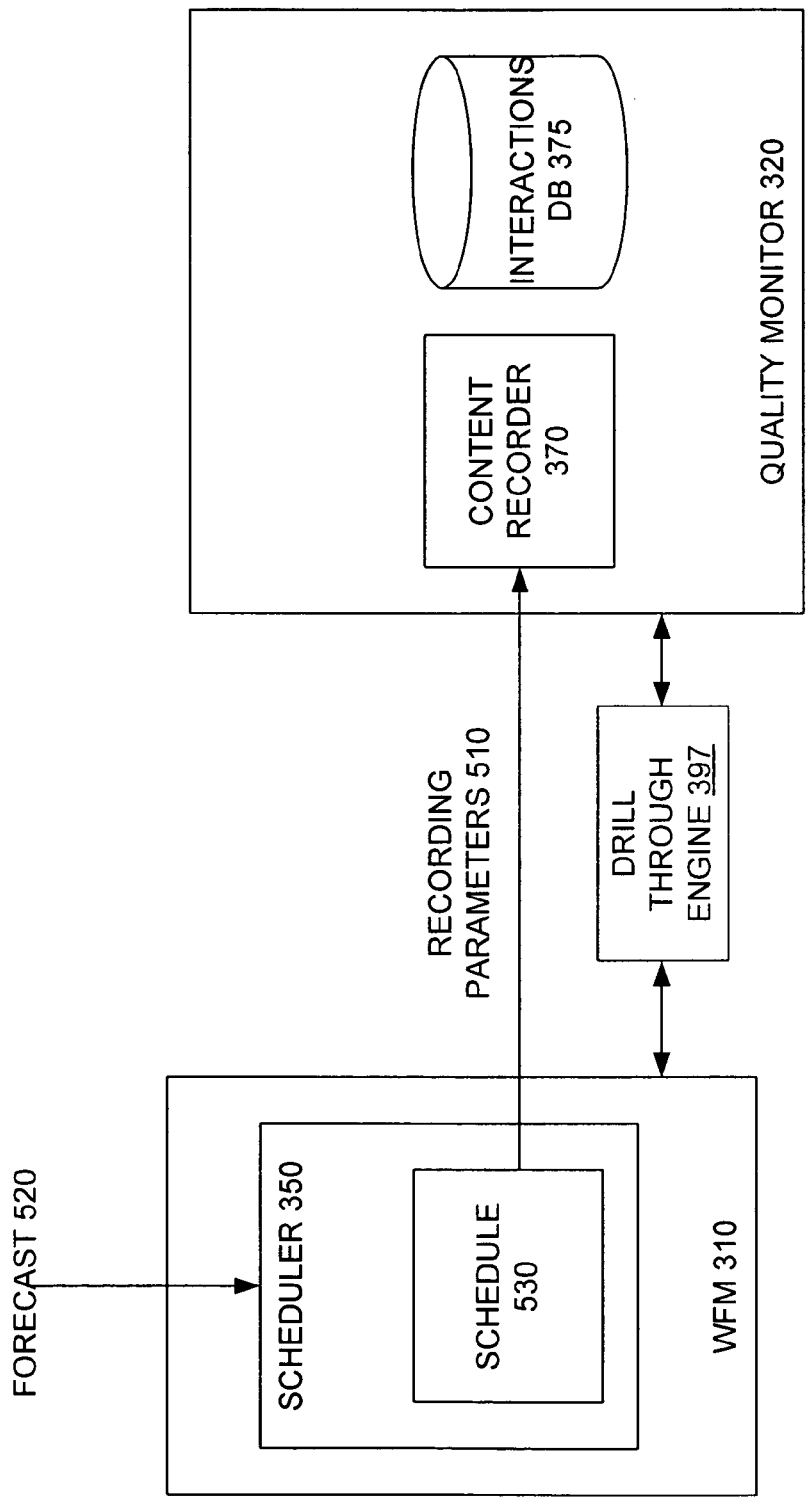
FIG. 5 shows a point of integration between WFM and quality monitor, such as that as shown in FIG. 3.

FIG. 5 shows an additional point of integration between the WFM 310 and the quality monitor 320, in which agent activity, adherence, and/or scheduling information is used to trigger selective recording in a selective recording environment, or to perform smart selection of recording for evaluation in a total recording environment. In a conventional quality monitor 320, the content recorder 370 can be configured to record a certain number, or percentage, of agent-customer interactions. This parameter is typically fixed for the duration of a campaign, though it can vary from one campaign to the next.

In the integrated system 500, the WFM 310 generates call recording parameters 510 based on information contained in the forecast 520 (e.g., call volume and call type) and/or the schedule 530. The recording parameters 510 are provided to the content recorder 370 in the quality monitor 320. This integration allows the content recorder 370 to adapt recording behavior during a campaign.

As an example of how this feature is useful to a customer center, consider a marketing campaign that starts on a Monday and lasts all week. It is expected that call quality for agents on this campaign can be relatively low on Monday, since the material is new to the agents. By the end of the week, the agents are more familiar with the material, so agent quality scores are expected to increase. If the agent quality scores do not increase after Monday, the drill through engine 397 enables a user of the quality monitor 320 to drill down through various levels of information associated with the campaign, via graphical user interfaces, to obtain audio recordings, for example, for analysis, so that the root cause of the low agent quality scores can be determined.

The recording parameters 510 provided to the content recorder 370 in the integrated system 500 allow a customer center manager to increase the percentage of interactions recorded at the start of the campaign, and to reduce the percentage as the campaign progresses. The recording parameters 510 can be further associated with one agent, or a set of agents, so that inexperienced agents (e.g., agents with low scores) have a higher percentage of recorded interactions as compared to more experienced agents. The drill through engine 397 can also receive the recording parameters 510 and monitor whether the quality monitor 320 achieved the recording parameters 510. If not, the drill through engine 397 can provide the root cause of the non-compliance to the customer center manager. Operation of the drill through engine 397 that facilitates integration between the WFM 310 and the quality monitor 320 is described in relation to FIG. 14.

Other examples of using WFM data to determine recording behavior include: trigger or select recording based on relative elapsed time from the beginning of the shift; trigger or select recording before or after specific activities (e.g., after lunch or before break activity); and trigger or select recording based on adherence data (e.g., agent is on call but not adhering to schedule).

Figure 6:
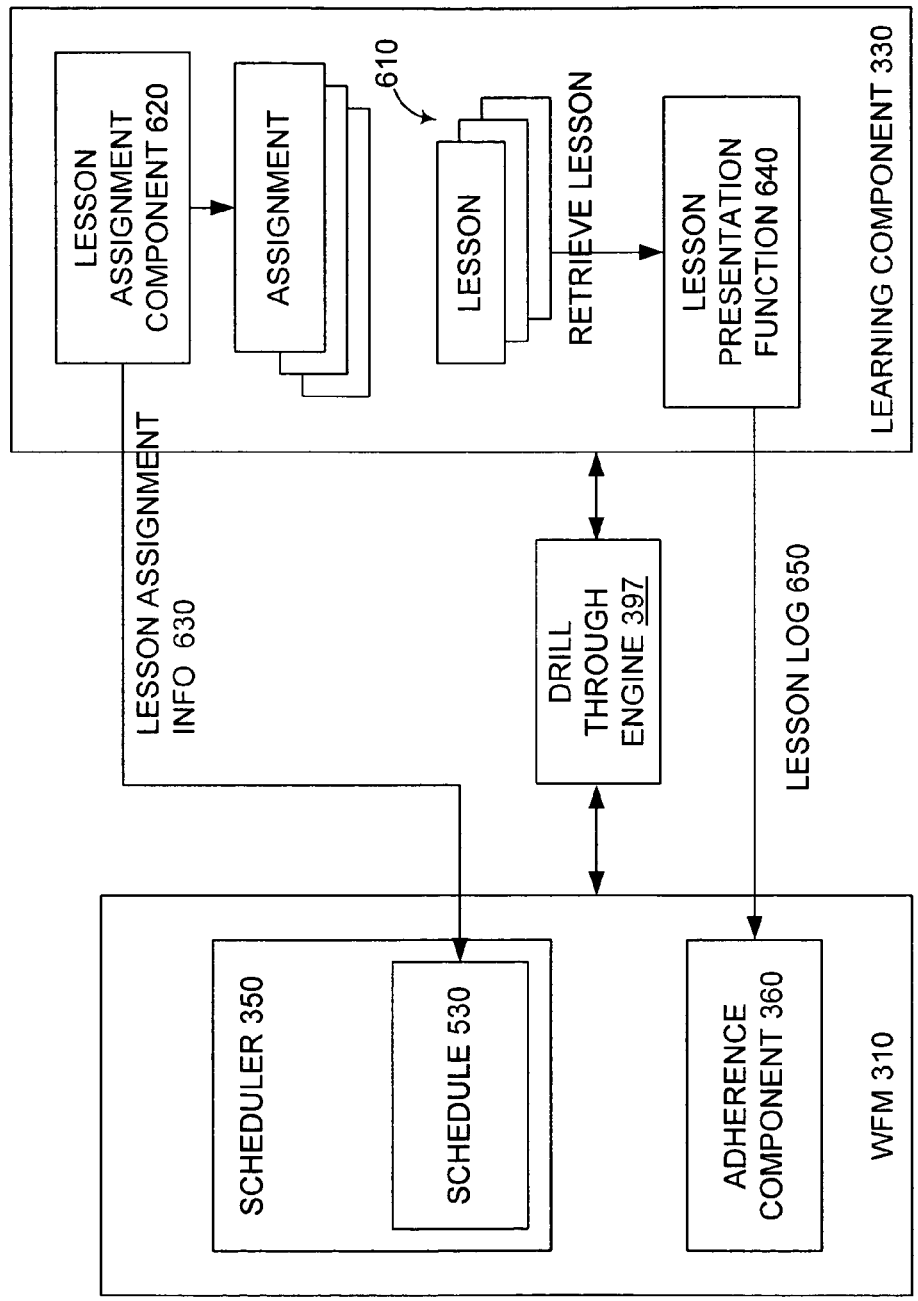
FIG. 6 shows several points of integration between WFM and a learning component, such as that shown in FIG. 3.

FIG. 6 shows several points of integration between the WFM 310 and the learning component 330. The learning component 330 includes lessons 610. Each lesson 610 is designed to improve an agent's competence in a particular area. Lessons are assigned, either manually or automatically, through a lesson assignment component 620, which communicates information about the assignment 630 to the scheduler 350 in the WFM 310. In one embodiment, the information 630 includes an agent identifier, a lesson identifier, a lesson duration, and a lesson completion date. After receiving the lesson assignment information 630, the scheduler 350 modifies the schedule 530 to include a training activity for the identified agent. If possible, the new training activity is scheduled before the lesson completion date. The drill through engine 397 can monitor whether there was a modification in the schedule 530 and provide information to the user that the schedule has been modified to include the training activity.

An agent receives training through a lesson presentation function 640. The presentation may take the form of viewing a video and/or listening to audio at the agent workstation 120. The lesson presentation function 640 maintains a lesson log 650, which tracks the presentation of lessons 610 to agents. In one implementation, the lesson log 650 includes an agent identifier, a lesson identifier, the time when the lesson presentation began, and an indication of whether the lesson has been completed.

In yet another point of integration between WFM 310 and the learning component 330, the lesson log 650 is provided to the adherence component 360 in the WFM 310. The adherence component 360 uses information in the lesson log 650 to determine whether an agent has met the lesson completion date. If not, the adherence component 360 notes the incomplete lesson as an exception to adherence. The drill through engine 397 receives the exception information and tracks the information indicating the cause for the exception. The operation of the drill through engine that facilitates integration between the WFM 310 and the learning component 330 is described in relation to FIG. 15.

Scheduling assigned lessons and tracking adherence to these assignments is further described in U.S. patent application "Tracking of Lesson Adherence in a Call Center Environment," filed on Feb. 22, 2006 and having Ser. No. 11/359,194, and entirely incorporated by reference herein.

Figure 7:
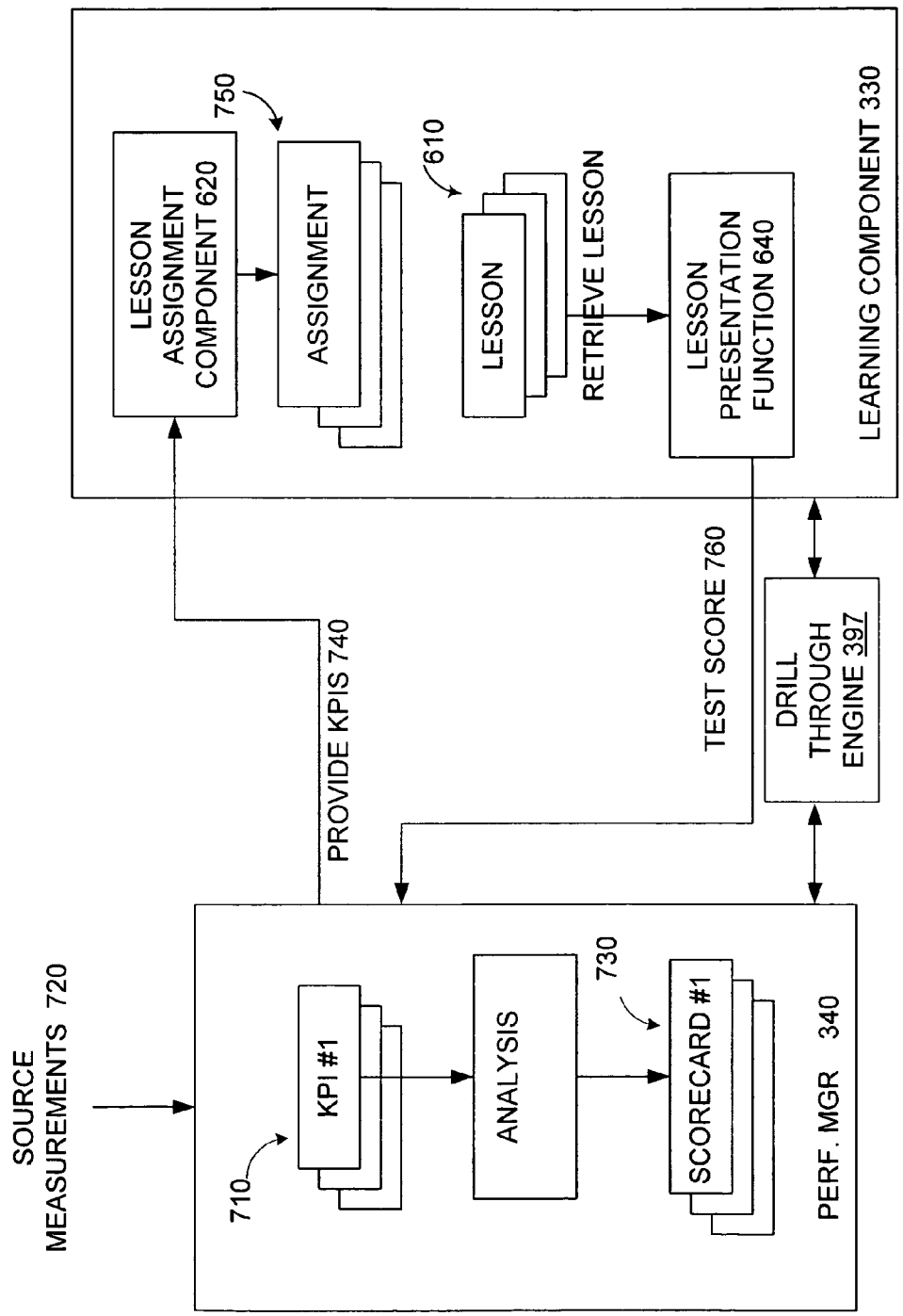
FIG. 7 shows several points of integration between a performance manager and a learning component, such as that shown in FIG. 3.

FIG. 7 shows several points of integration between the performance manager 340 and the learning component 330. The performance manager 340 maintains key performance indicators (KPIs) 710 that measure how well an agent or group of agents is performing. The KPIs 710 may be based on one or more source measurements 720, such as evaluations from the quality monitor 320 and call statistics from call router 140 (e.g., call duration, hold time during call, etc.)

The performance manager 340 does analysis on the KPIs 710 and/or the source measurements 720 to produce scorecards 730. The analysis may include calculating statistics such as average, variation, etc., aggregating by time period or groups of agents, and determining trends. The scorecards 730 are then presented in visual form to a user. Examples of scorecards are a daily scorecard for an agent or a team and a scorecard of all agents for the past month.

In the integrated system 700, the KPIs 710 are also provided 740 to the learning component 330. As described earlier, the learning component 330 maintains lessons 610 which can be assigned to an agent for review. In the integrated system 700, each lesson 610 is associated with one or more KPIs 710. The lesson assignment component 620 examines one or more of the KPIs 710 for a particular agent, and makes an assignment 750 for a lesson 610 associated with that KPI 710, based on criteria associated with a KPI or a competency. In one implementation, the criteria is a comparison of one or more KPIs 710 for an agent to threshold values, and the lesson assignment component 620 assigns a lesson 610 if the KPI 710 is lower than the threshold. This point of integration therefore allows automatic lesson assignment based on KPI 710.

Automatic lesson assignment is further described in U.S. patent application "System and Method for Integrating Learning Systems and Scorecards Systems", filed on Feb. 22, 2006 having Ser. No. 11/359,359, and entirely incorporated by reference herein. Alternatively or additionally, the drill through engine 397 can monitor and track information indicating whether the KPIs 710 of the agents are below the threshold values and if so, the drill through engine 397 can provide the supervisor or agent with information corresponding to the root cause of the KPIs. The drill through engine 397 can associate the low KPIs with the lesson 610 and provide a schedule of the agent indicating that the lesson 610 has been assigned to the agent due to the agent's low KPI 710.

The lesson 610 may also include a test that is given to the agent to determine competency in the area associated with the lesson 610. In yet another point of integration between WFM 310 and the learning component 330, the agent test score 760 for an agent is provided to the performance manager 340. The performance manager 340 updates the KPIs 710 to reflect the agent competency described by the test score 760. The drill through engine 397 can associate the test score with the low KPIs and provide the test score to the supervisor or agent. The operation of the drill through engine 397 that facilitates integration between the performance manager 340 and the learning component 330 is described in relation to FIG. 16.

Figure 8:
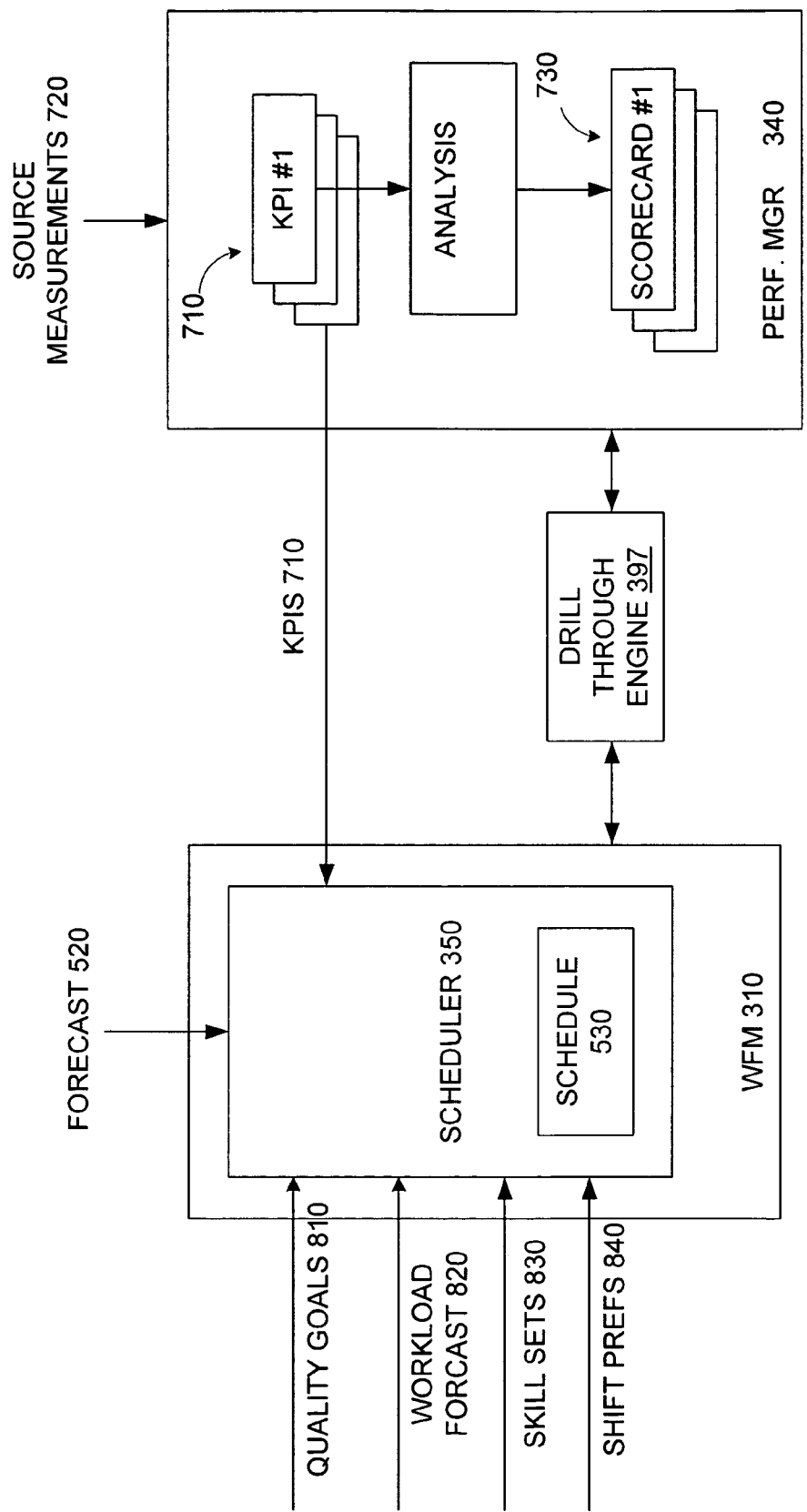
FIG. 8 shows a point of integration between WFM and a performance manager, such as that shown in FIG. 3.

FIG. 8 shows a point of integration between the WFM 310 and the performance manager 340. Conventional schedulers allow agents to set preferences for shift assignments (e.g., one agent prefers to work weekends and another prefers to work nights). Since most agents are expected to prefer a day shift rather than a midnight shift, shift preferences are typically combined with agent ranking or seniority, so that someone works the midnight shift. This leads to a situation where the midnight shift is staffed with all of the "worst" agents.

As described earlier, the performance manager 340 maintains KPIs 710 that measure agent and/or group performance. In the integrated system 800 shown in FIG. 8, the scheduler 350 considers agent KPIs 710 when scheduling, so that some "good" agents are also added to the shift. The KPI 710 may reflect, for example, an evaluation of the agent's performance on a set of customer interactions. In one embodiment, the scoring is done by a person while playing back the recorded interaction. In another embodiment, the scoring is at least partly automated through the use of speech analytics.

The agent KPIs 710 are provided to the scheduler 350 in the WFM 310. Also provided to the scheduler 350 are quality goals 810 for a particular schedule interval. Examples of quality goals are "50% of agents have a score at of least 80" and "average score is at least 80."

The scheduler 350 considers the quality goals 810 and the KPIs 710, along with other inputs, to determine a schedule 530 which includes agent assignments to work activities at specific times. The scheduler 350 also considers, for example, a workload forecast 820, agent skill sets 830 and agent shift preferences 840. The scheduler 350 then chooses a mix of agents to work a shift, so that the agent scores combine to meet the quality goals 810. Integration of KPIs and the scheduler is further described in U.S. patent application "Systems and Methods for Scheduling Call Center Agents Using quality Data and Correlation-Based Discovery," filed on Feb. 22, 2006 having Ser. No. 11/359,731, and entirely incorporated by reference herein.

The drill through engine 397 monitors the schedule 530 to determine whether the schedule is executed. If variance occurs to the schedule, such as an agent calls in sick, the drill through engine 397 provides information to a supervisor indicating that the agent has called in sick and how the agents have been rescheduled to accommodate this situation.

Figure 9:
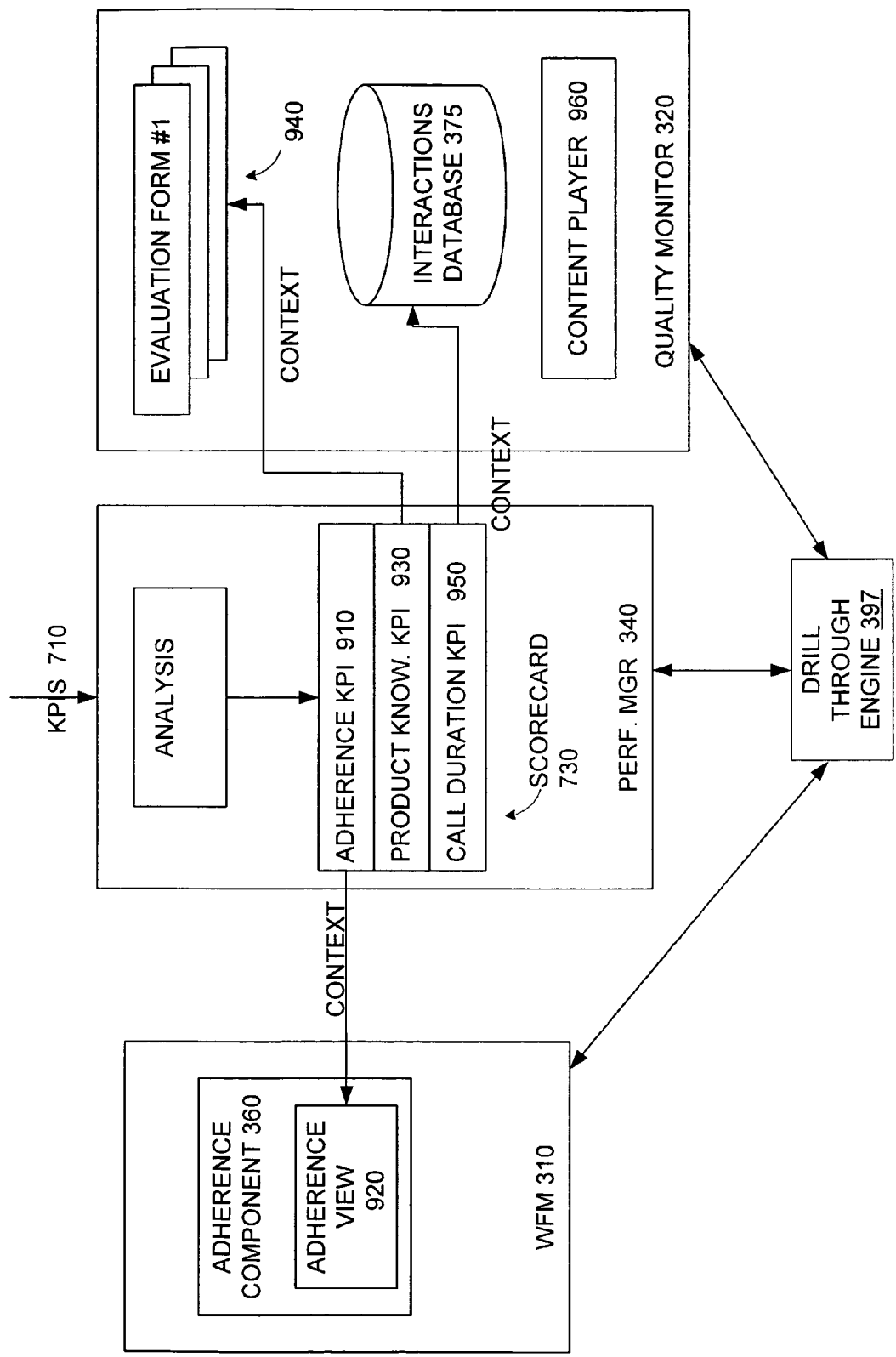
FIG. 9 shows a point of integration between a WFM and a performance manager, such as that shown in FIG. 3.

FIG. 9 shows another point of integration between the WFM 310 and the performance manager 340. As described earlier, the performance manager 340 maintains KPIs 710 that measure agent and/or group performance, and produces scorecards 730 from the KPIs 710. The scorecards 730 provide a quick way for a manager to determine areas that require attention. For example, if a particular agent is out of adherence or has a low competency score, then the adherence or competency KPI can be flagged with a warning icon.

Typically, the manager wants more detailed information about the flagged problem area. A conventional customer center solution requires the manager to open up a particular application, such as Adherence or Quality Monitoring, to obtain detailed information about the problem area. Once in the application, the manager must then navigate to the root cause of the problem (e.g., the activity that was out of adherence).

In contrast, the integrated system 900 allows a user to quickly view details associated with the flagged problem area, in the appropriate application context. The drill through engine 397 facilitates the integration of the WFM 310, performance manager 340, and quality monitor 320 by monitoring the flagged problem area and providing root cause information to the users. Several examples of this use of application context are shown in FIG. 9. When interacting with the performance manager 340, selecting an adherence-related KPI 910 in a scorecard 730 brings the user to a view 920 of adherence information. Furthermore, the particular agent activities that resulted in the out-of-adherence flag 910 are highlighted or otherwise brought to the user's attention in the view 920. Alternatively or additionally, the out-of-adherence flag 910 is sent to the drill through engine 397, which provides a link to obtain information indicating the particular agent activities. As another example, selecting a quality score-related KPI 930 brings the user to the quality monitor 320, and more specifically to the particular evaluation form 940 which contains the flagged quality score 930. The user can click on a link to obtain the flagged quality score 930 along with the particular evaluation form 940 via the drill through engine 397. The operation of the drill through engine 397 that facilitates integration among the WFM 310, performance manager 340 and quality monitor 320 is described in relation to FIG. 17.

As yet another example, selecting a call statistic-related KPI 950, such as call duration or hold time, brings the user to the quality monitor 320. The quality monitor 320 presents a list of recorded interactions (from the interactions database 375) which contributed to, or are in someway related to, the flagged call-statistic score 950. The user can click on a link to obtain the flagged call-statistic score 950 along with the list of recorded interactions via the drill through engine 397. The user can then play back (960) one of the recorded interactions. The integrated system 900 thus greatly simplifies root cause analysis for customer center personnel.

Call recording and monitoring are vital to customer center operations and the business. Every day, insight and feedback on the organization are gained from customer interactions. Valuable business intelligence can be extracted from these calls to help call center executives improve operational efficiency, customer satisfaction, and profitability. Yet management can only listen to a small segment of recorded calls. Managers must search manually through an enormous number of calls just to find the calls they need to analyze. The process is not only inefficient and expensive, but valuable information is continually ignored, leaving only a small sample of data needed to make informed business decisions.

Figure 10:
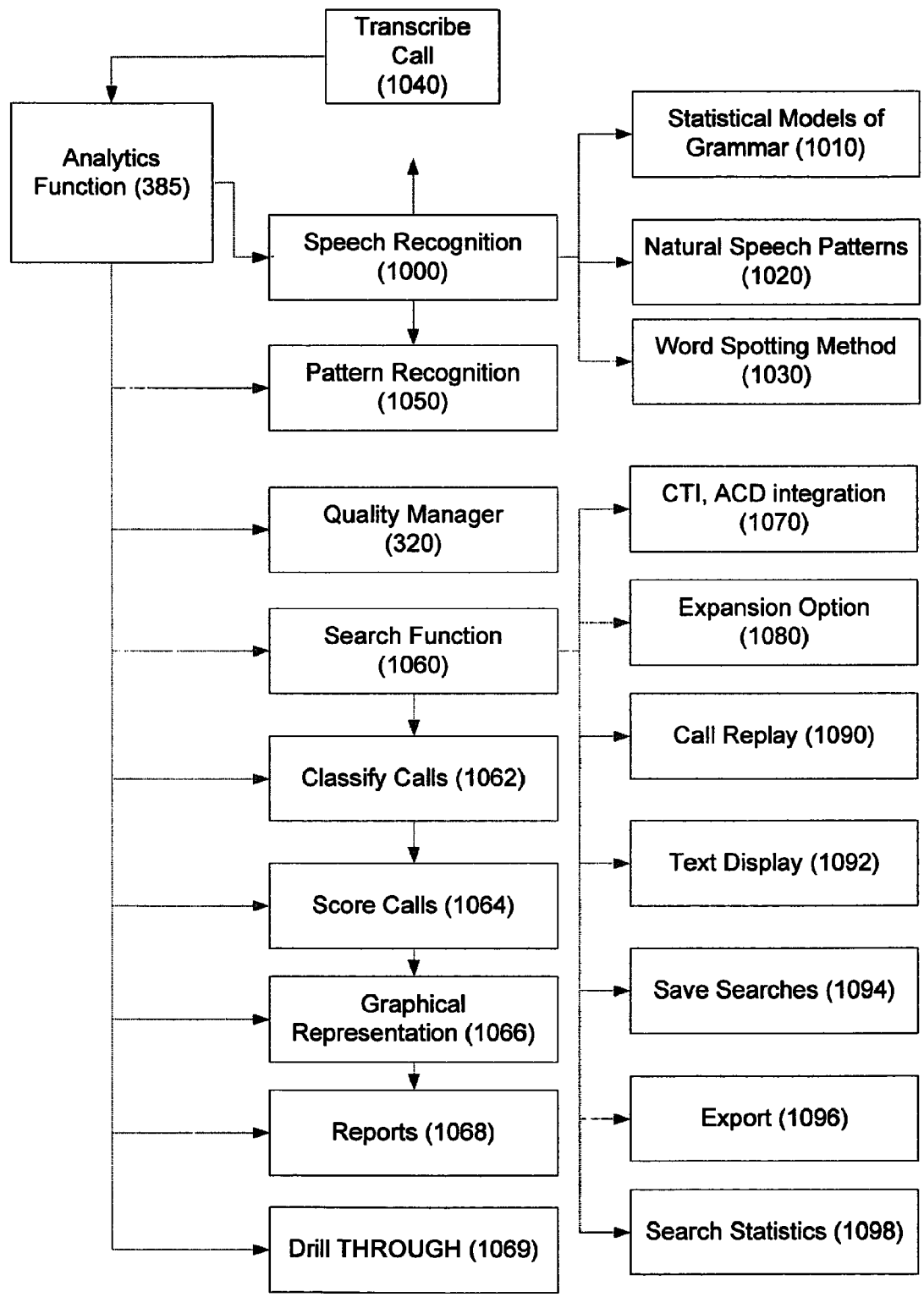
FIG. 10 shows components of the analytics function of FIG. 3.

Referring now to FIG. 10, with the analytics function 385 of the present disclosure (first introduced in FIG. 3), customer centers can now convert all call recordings into actionable business intelligence. Management can discern important competitive and business insight and easily identify trends from customer interactions, by analyzing speech, telephony, agent, and recording data together. In an enhancement, the analytics function 385 also streamlines the quality monitoring process by automatically classifying and scoring calls, based on selection criteria that may include any or part of the data captured by the integrated systems disclosed herein, including speech analytics.

The analytics function 385 enables businesses to: (1) have a more accurate view of the customer experience, which allows executives across the organization to uncover critical customer attitudes, needs, and requirements; (2) automatically score and classify calls for easy retrieval and examination, which enables call centers to digitally score calls to conduct automated quality and customer satisfaction surveys; and (3) discover trends related to customer behavior (e.g., churn, product adoption) that impact the business.

The analytics function 385 preferably uses speech recognition 1000 to convert the recorded calls into a searchable repository that allows for the query of words and/or phrases contained within the recorded calls. This repository may manifest itself as a text transcript or searchable phonetic model of the recorded calls. The analytics function 385 may apply additional unstructured data analysis techniques to refine and extract the context and further meaning from the conversations. Examples of various techniques that may be applied to refine the context of the mined speech, or the speech-to-text conversion, include: statistical modeling of grammar using a statistical model of grammar 1010 module; and natural language processing using a natural speech patterns 1020 module. Further, the analytics function 385 identifies the critical words and phrases within the context of the conversation. All this enables the embodiments disclosed herein to capture the intent of the call, rather than merely the words of the call.

In an alternative embodiment, the analytics function 385 converts the audio of the conversation into a phonetic representation of the call and uses a word-spotting method 1030 (or a query analysis), which flags or tags calls by a specific word, phrase, proximity, inflection, tempo, or emotion. Queries may be performed on an ad-hoc basis or stored for pattern analysis.

With the recorded calls converted to searchable content (via a transcribe call 1040 represented in FIG. 10), the analytics function 385 allows users to look back in time to discover what customers have said. In some embodiments, users do not need to know in advance what they are looking for. For example, if there was a spike in call volume last week, the analytics function 385 can enable the customer center to understand the reason for the increased calls. Also, the user can incorporate metadata obtained from telephony or CRM systems to gain further insight into the reasons for the call spike.

In an enhancement, the analytics function 385 also uses a pattern recognition module 1050 to pull meaning out of the results generated by speech recognition. The pattern recognition module 1050 discerns the call's pattern and automatically places the call into one or several categories once the call is ingested into the speech engine, based on context the pattern recognition module 1050 is able to extract from the speech mining function. The patterns are used not only to classify calls but also to determine if a particular activity has occurred during the call, or to automatically score individual evaluation or survey questions based on this data. For instance a call score might be correlated to an existing evaluation or customer survey question during the call (e.g., "did the agent offer a cross sell", "did the agent remember to read the corporate policy"). By automating the labor-intensive quality monitoring processes, customer centers can realize not just a fast return on investment, but also deploy resources where they are strategic to the call center.

The analytics function 385 can link the call content to the metadata from, for example, a quality monitoring component (see FIG. 3), to relate characteristics such as agent ID, time/date, speaker's name, workgroup ID, and call routing. The analytics function 385 can link to custom data sources that may contain other information related to the agent/customer interaction, for example, a CRM system.

The analytics function 385 also includes a search function 1060. An append feature in the search function allows the user to modify the initial search by tacking on additional criteria and logic. A refine feature function allows the user to add to the search criteria, which are then used on the results of the last search. A remove feature allows the user to modify the initial search by tacking on additional criteria and logic. An undo feature allows any of the modifications just described to be reversed. In one enhancement, results from the initial search string using the search function 1060 can be refined to help focus on particular calls of interest. In another enhancement, users can combine the search functionality described above with data from the CTI, ACD and other sources via a CTI ACD integration 1070 module.

Different individuals use different words or phrases to depict a similar meaning. Recognizing this fact, the analytics function 385 enables users to expand single words into complete concepts, which convey intent and meaning, rather than being tied to one narrow possibility. An expansion option 1080 allows users to include plural, synonym, homonym, and containing words, in a single clean screen. For example, instead of searching for the single word "bill", the user can select to search for "bill, bills, account, charges, invoice, statement, billing, billed, bell", which will most likely return better results because it takes into account the differences of expression.

In one enhancement, the expansion option 1080 allows for the identification of temporal relationships between words, phrases and other collected events in order to better identify the context of the conversation. For example, a search that includes the word "supervisor" in a temporal relationship with words like "transfer me to", or in relationship to a call transfer event, can provide much more context than a search for "supervisor". The expansion option allows users to capture more instances of the concept that they are exploring and furthermore establish the intent of the calls. This improves upon keyword-spotting technologies, which are not good enough to perform ad-hoc searching for concepts, which is the ultimate goal in content discovery.

The analytics function 385 further enables the user a variety of ways to derive insight from the search results. The Call Replay 1090 component allows the user to listen to an audio file from the search results, in part or in its entirety. Playing a portion of the audio allows the user more efficiently to go through the search results without having to waste time listening to the whole conversation. The Text Display 1092 component shows a continuous text for the entire recognized content when playing back part or all of a call. This allows users to quickly capture terms and expressions exchanged in the call that might be of importance. The Save Searches 1094 component allows a user to save and easily retrieve searches for further refinement and analysis. The Export 1096 component allows search results to be exported to a wide variety of formats, such as Microsoft Excel or Adobe PDF format. The Search Statistics 1098 component displays information on the current search (e.g. calls counted, search time). In one enhancement, the analytics function 385 further includes a call visualization component which includes an interface for displaying the text of a set of calls along with other data captured by the integrated system of the present disclosure along with integrated sources. A call visualization component is more fully described in the '705 application and incorporated by reference above.

Preferably, the analytics function 385 automatically classifies and scores calls via classify calls 1062 module and a score calls 1064 module. This feature can greatly reduce the time and effort that customer centers spend on the quality monitoring process by "structuring" unstructured voice recordings and categorizing them. The classify calls 1062 module preferably classifies calls based on the content. A call may be classified into one or more "buckets." The analytics function 385 relies on the concept that all conversational threads have at their core one or more "patterns" of speech.

Patterns are complex descriptions of different ways that people communicate information, not just simple "words" for matching. These patterns of speech do not have to contain exact word matches for particular search terms, but they only "look" like a specific pattern. Each pattern is defined and assigned a weight by the pattern developer, and each area of intent is assigned a threshold. If a group of patterns match and their added weights exceed the threshold, then that conversation is said to "look" like and contain that intent.

The weights and threshold are user definable and therefore easily tweaked to produce better and more accurate results. A typical intent "bucket" will contain anywhere from five to 100 "patterns" to match. Patterns can be shared across domains and industries, and pattern bases can evolve forward to deliver ever more accurate and finely tuned pattern matching.

The analytics function 385 uses patterns not only to classify calls via the classify calls 1062 module, but also to evaluate if a particular activity occurred during a call via the score calls 1064 module. The user begins by designating the objective criteria on which the calls are to be scored into the application. A set of patterns is then described for the criteria. A call is then scored based on the extent to which the criteria patterns were fully met, partially met, or not met at all. Each weighted threshold for each score level can be customizable.

The analytics function 385 allows the user to create a graphical representation of trends found in the calls via a graphical representation 1066 module. This enables a user to view statistics about complex trends over a large time period.

The trend view displays a suite of ad-hoc reports that can be easily configured by the parameters in Table 1.

TABLE 1

| Time/Day Interval | Value to Calculate | Segmentation |
| --- | --- | --- |
| Day of Week | Avg # Words Per Call | By Agent |
| Month | Avg Call Length In Seconds | By Agent Group |
| By Week | Call Count | By Content Group |
| By Quarter | Hit Total | By Customer Account |
| By Year | Sum (WAVLength) | By Department |
| By Location | | |

By visualizing the information such as by the parameters above, the user can gain a more detailed view on the particularities of the search phrases.

Another trending capability is the display of, for example, the top 200 words mentioned in the recorded calls (where the number of top words is customizable). The analytics function 385 proactively shows the words that are unusually more frequent than before or compared to the standard language.

This acts as an "early warning system" to enable organizations to understand how the conversations have changed from one period to the next.

Preferably, the analytics function 385 organizes and delivers results customized to the end-user's requirements via a reports 1068 module. In an enhancement, reports 1068 module allows for scheduling options that enable users the ability to vary frequency of report delivery so analysts can zoom in on critical data metrics hourly, daily, monthly, etc. Users can customize and automate reporting. Once a query is created, the user can save the query to run automatically. Users can create and view reports in different formats while using the web-based viewer. For example, reports can be output as Excel or PDF files, and then emailed. The reports are interactive, in that calls can be played back from the results of the report. The reports 1068 module, which is preferably based on industry-standard databases such as SQL, can be used to customize reports, to extract, format and report from the underlying data. In another enhancement, the reports 1068 module is a dashboard reporting system which can, for example, link the actual calls detected for each event or report.

The analytics function 385 can provide business rules, goals, and specifications of the integrated system to a drill through module 1069. The drill through module 1069 analyzes the received business rules, goals, and specifications of the integrated system. The analysis enables the drill through module 1069 to monitor the integrated system and tracks information indicating areas that need attention.

For example, in an enhancement, the drill through module 1069 can monitor the schedule of agents and tracks information indicating whether there are any variances from the schedule, such as agents being out sick for a certain period of time. The drill through module 1069 can provide information indicating that the schedule of the agents has changed, information indicating the root cause for the change, and which agents "fill-in" for the agent's shift.

In another example, the drill through module 1069 monitors the performance of the agent and tracks information indicating that the agent is not reaching goals via, for example, quality monitoring. The drill through module 1069 can provide information indicating the root cause for the "bad" performance. The drill through module 1069 can further provide information indicating that training lessons have been taken to improve the "bad" performance.

In yet another example, a scheduler may review the workflow schedule for a group of agents and realize that call volumes exceed what was anticipated for that day and queue time is in excess of what is desired. The scheduler may choose to send an alert to a group of agents to change procedures to better address the situation or to send a request to volunteer to work overtime to fill the need. Another use would be to send messages for shift bidding and have a bi-directional means for agents to give their approval to work and overtime requests.

FIG. 11 is a hardware block diagram of a general-purpose computer 1100 that can be used to implement one or more of the components of the integrated customer center system 300 disclosed herein. The computer 1100 contains a number of components that are well known in the art of call center software, including a processor 1110, a network interface 1120, memory 1130, and non-volatile storage 1140. Examples of non-volatile storage include, for example, a hard disk, flash RAM, flash ROM, EEPROM, etc. These components are coupled via a bus 1150. The memory 1130 contains instructions which, when executed by the processor 1110, implement the methods and systems disclosed herein. Omitted from FIG. 11 are a number of conventional components, known to those skilled in the art that are unnecessary to explain the operation of the system 1100.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of certain embodiments of the present disclosure includes embodying the functionality of the preferred embodiments of the present disclosure in logic embodied in hardware or software-configured mediums.

Figure 12A:
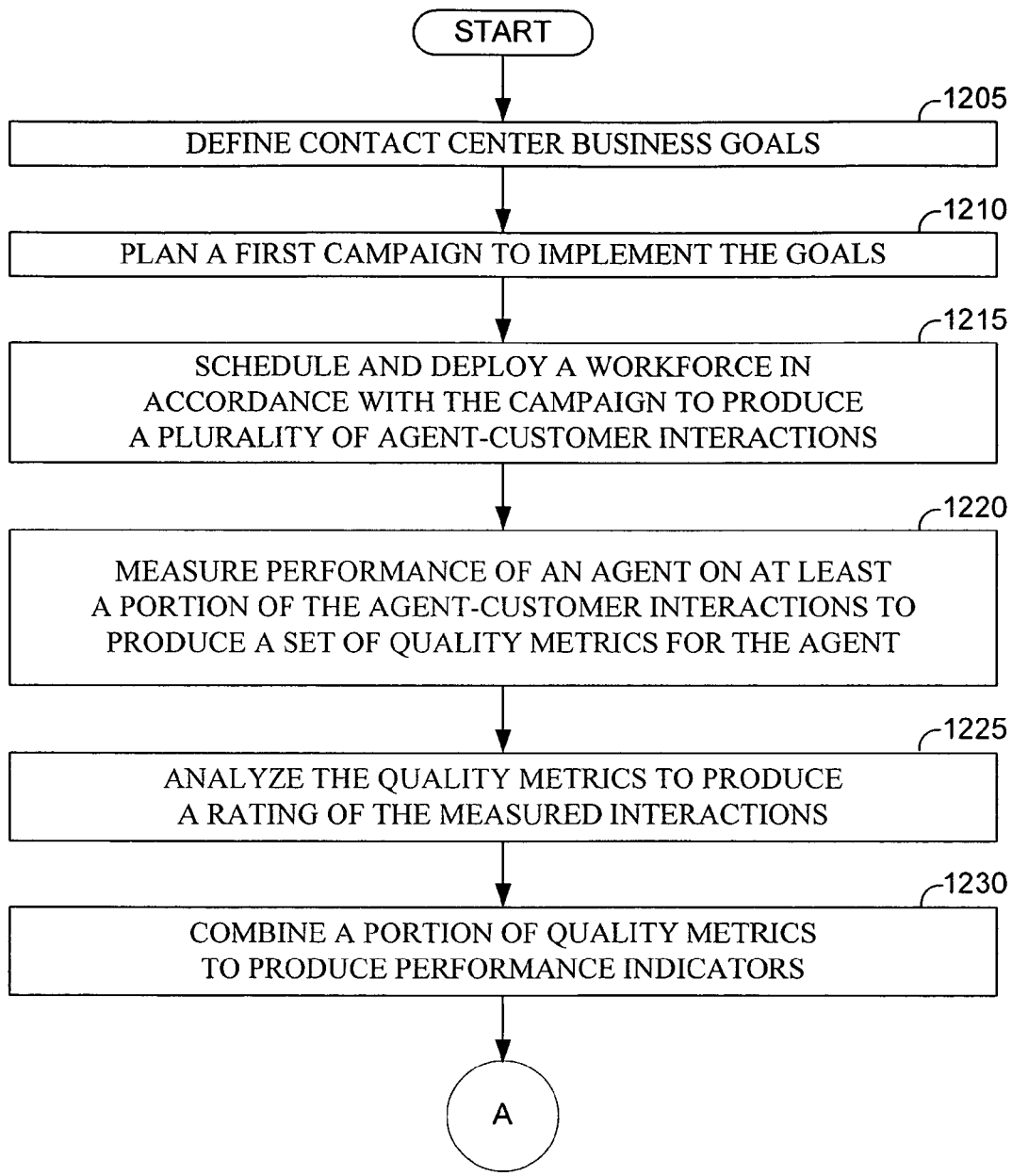
FIG. 12 is a flow diagram that illustrates high-level operation of a drill through engine, such as that shown in FIG. 3.
Figure 12B:
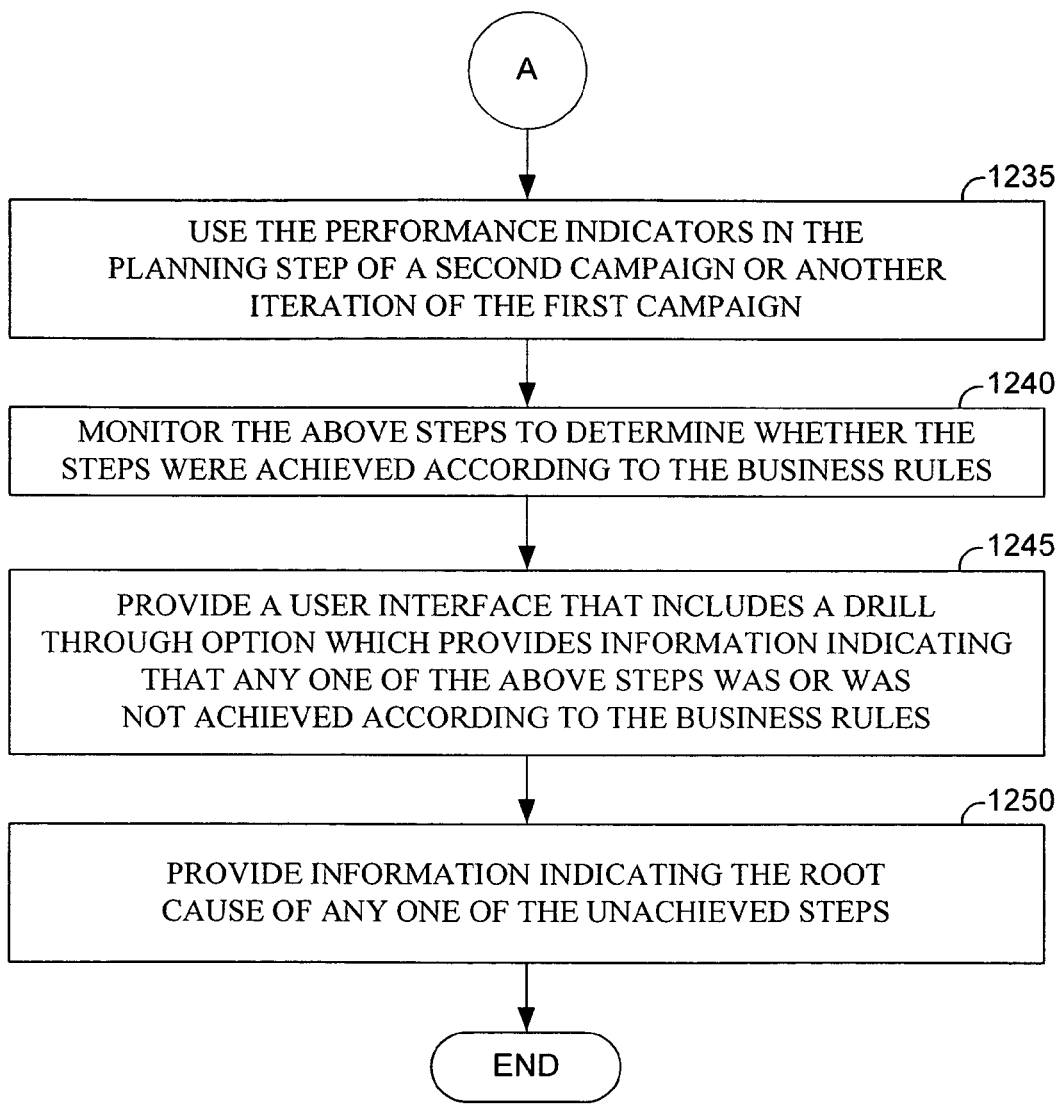

FIG. 12 is a flow diagram that illustrates a high-level operation of a drill through engine, such as that shown in FIG. 3. Beginning with block 1205, the customer center business goals are defined, and in block 1210, a first campaign is planned to implement the goals. In block 1215, a workforce is scheduled and deployed in accordance with the campaign to produce a plurality of agent-customer interactions. In block 1220, performance of the agent is measured on a portion of the agent-customer interactions to produce a set of quality metrics for the agent. In block 1225, the quality metrics are analyzed to produce a rating of the measured interactions, and in block 1230, the portion of quality metrics is combined to produce performance indicators.

In block 1235, the performance indicators are used to plan a second campaign or another iteration of the first campaign. In block 1240, the above steps are monitored to determine whether the steps were achieved according to the business rules. In block 1245, a user is provided with a graphical user interface that includes a drill through option, which provides information indicating the root cause of any one of the above steps that was not achieved according to the business rules. In block 1250, the information is provided indicating the root cause of any one of the unachieved steps.

Figure 13:
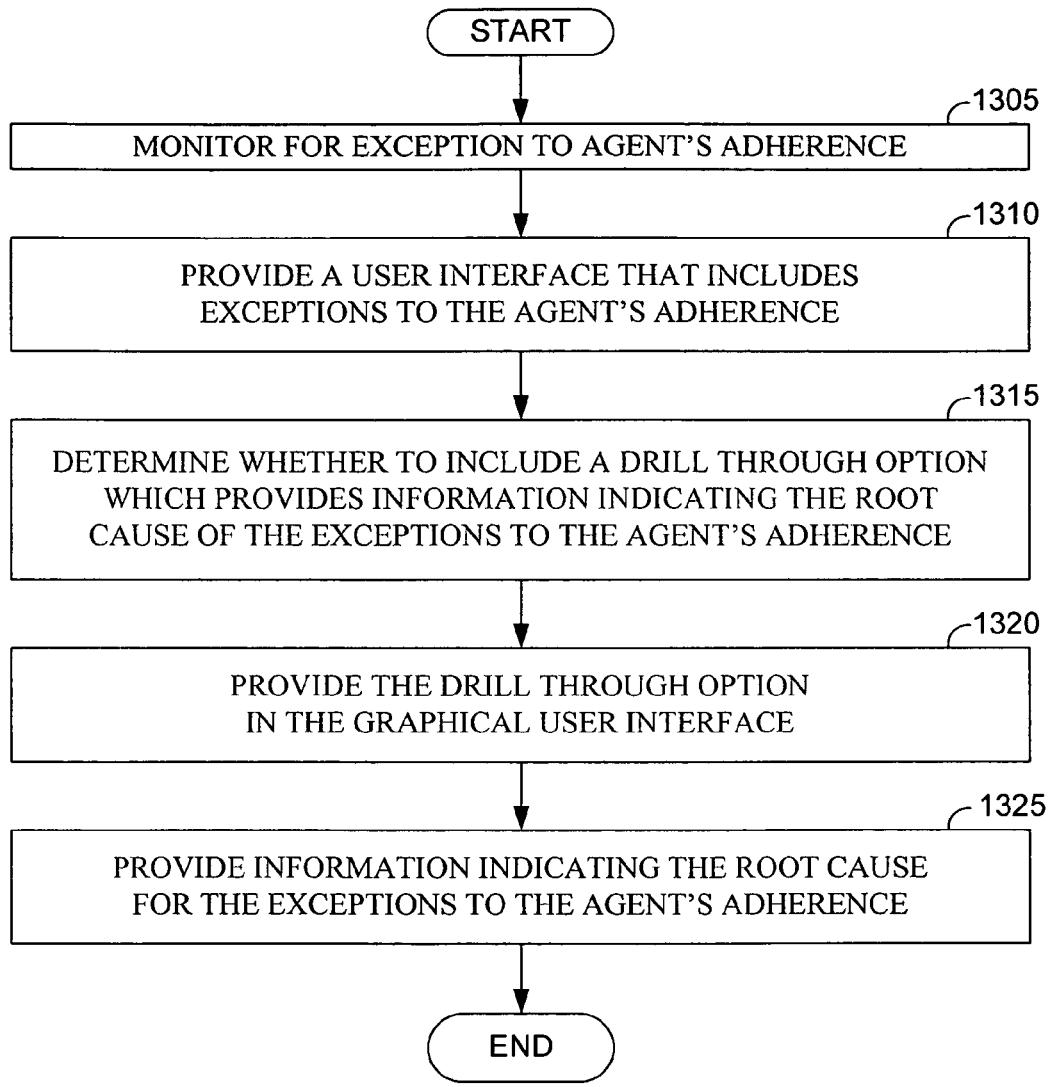
FIG. 13 is a flow diagram that illustrates operation of a drill through engine that facilitates integration between a WFM and a quality monitor, such as that shown in FIG. 4.

FIG. 13 is a flow diagram that illustrates an operation of a drill through engine that facilitates integration between work force manager and quality monitoring, such as that shown in FIG. 4. Beginning with block 1305, the operation includes monitoring for an occurrence of an exception to agent adherence. The agent adherence is determined from agent activities at the customer center. The exception to agent adherence includes at least one of poor interaction with customers, no-showing of a training lesson, poor test scores from a training lesson, and poor attendance, for example. In block 1310, the drill through engine provides a graphical user interface that includes exceptions to the agent's adherence, and in block 1315, the drill through engine determines whether to include a drill through option, which provides information indicating the root cause of the exceptions to the agent's adherence.

In block 1320, responsive to determining that the drill through option is to be included, the drill through engine includes the drill through option in the graphical user interface. In block 1325, the agent and supervisor select the drill through option, which provides information indicating the exceptions to the agent's adherence. In particular, the drill through engine can provide the agent activities by obtaining a list of agent activities stored in an interaction database, selecting from the list the agent activity that produced the exception to the agent adherence, and retrieving the agent activity that produced the exception from the interaction database.

Figure 14:
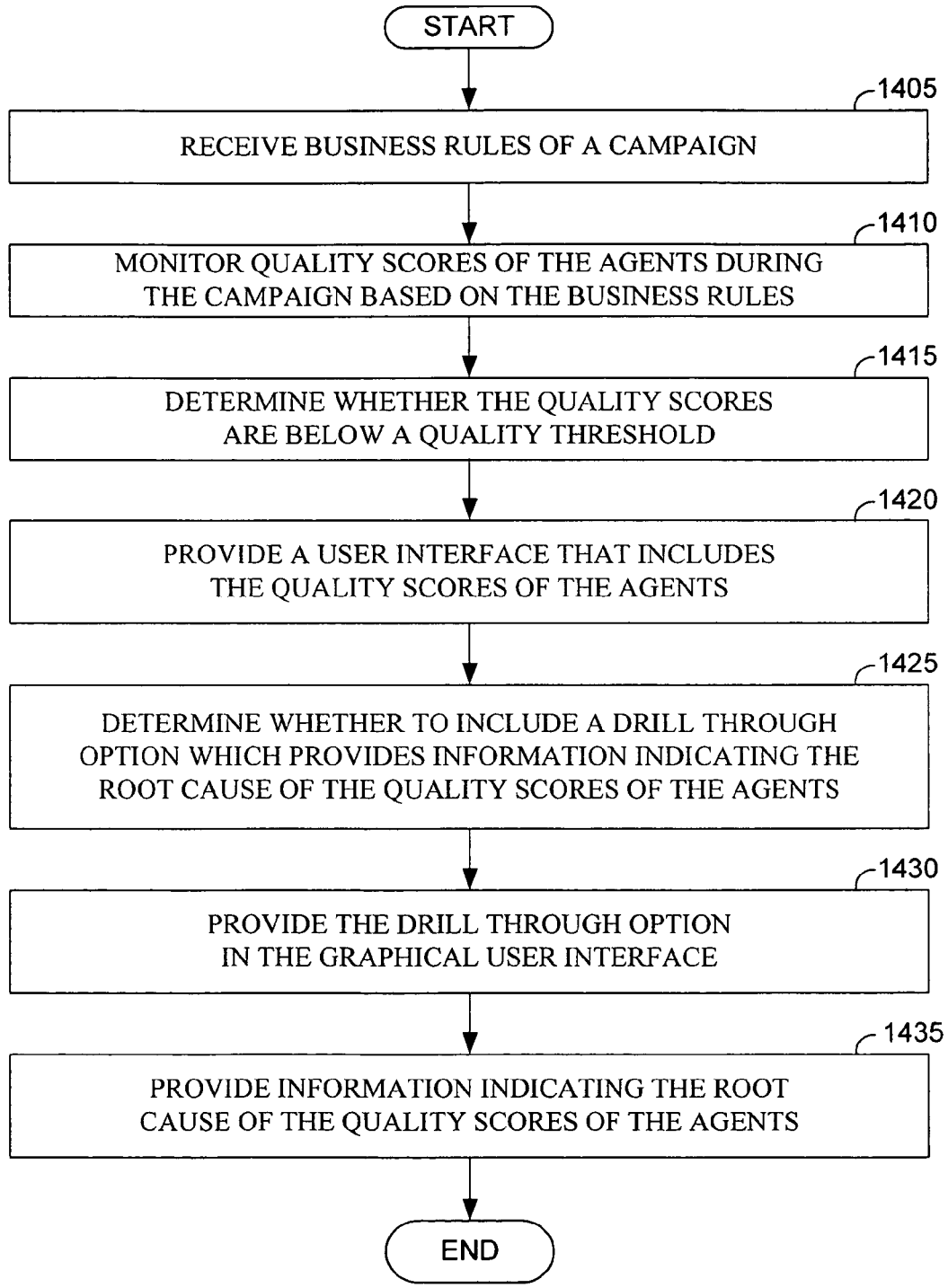
FIG. 14 is a flow diagram that illustrates operation of a drill through engine that facilitates integration between a WFM and a quality monitor, such as that shown in FIG. 5.

FIG. 14 is a flow diagram that illustrates an operation of a drill through engine that facilitates integration between work force manager and quality monitoring, such as that shown in FIG. 5. Beginning with block 1405, the operation includes receiving business rules of a campaign, which includes the schedule of agents. In block 1410, quality scores of the agents are monitored during the campaign based on the business rules. In block 1415, the quality scores are determined whether they are below a quality threshold. In block 1420, responsive to the quality scores being below the quality threshold, the agents are provided a graphical user interface that includes the quality scores being below the quality threshold. In block 1425, the drill through engine determines whether to include a drill through option, which provides information indicating the root cause of the quality scores of the agents. In block 1430, responsive to determining that the drill through option is to be included, the drill through engine includes the drill through option in the graphical user interface, and in block 1435, the user selects the drill through option, which provides information indicating the root cause of the quality scores of the agents.

Figure 15:
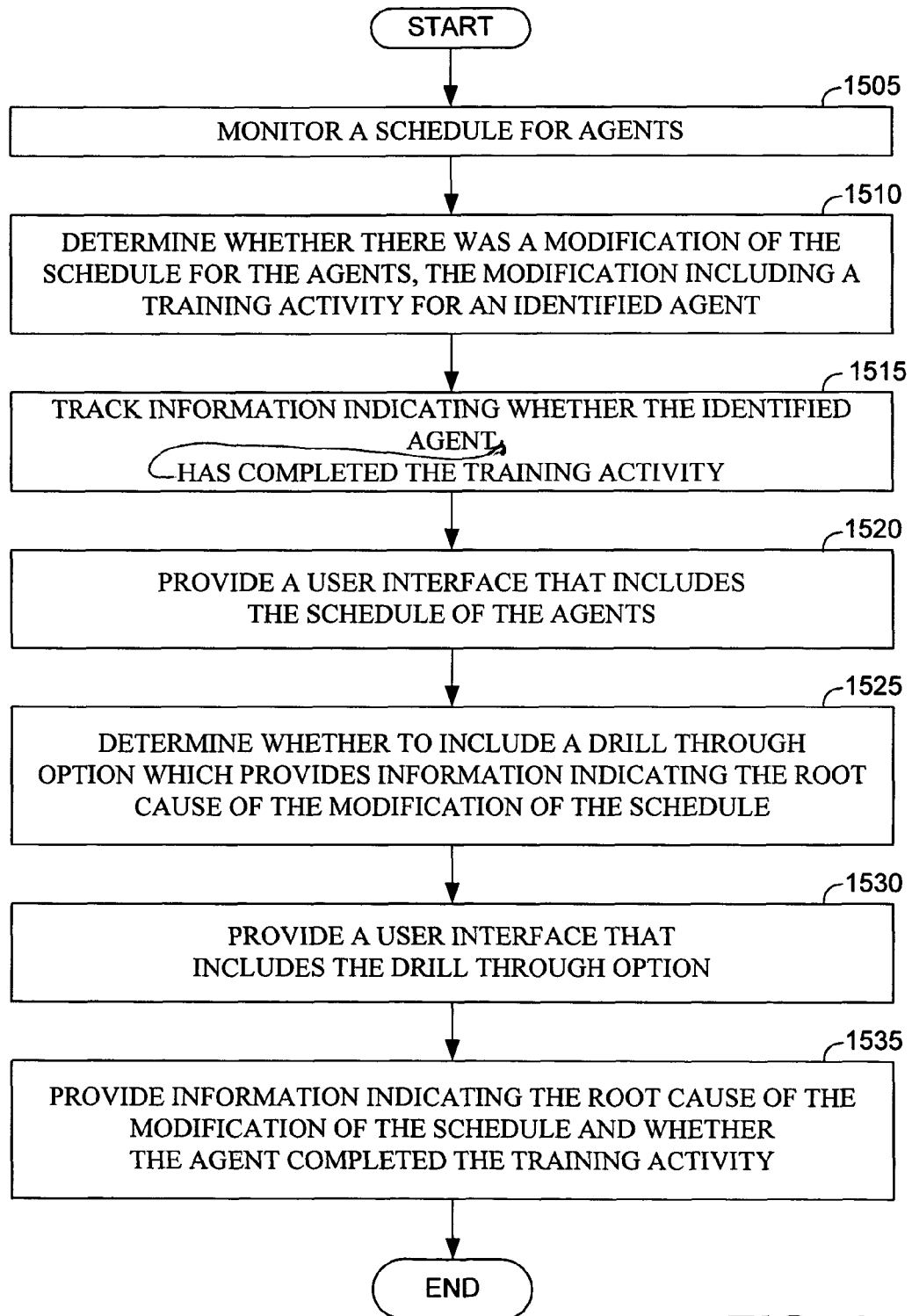
FIG. 15 is a flow diagram that illustrates operation of a drill through engine that facilitates integration between a WFM and a learning component, such as that shown in FIG. 6.

FIG. 15 is a flow diagram that illustrates an operation of a drill through engine that facilitates integration between work force manager and learning component, such as that shown in FIG. 6. Beginning with block 1505, the operation includes monitoring a schedule for agents, and in block 1510, determining whether there was a modification of the schedule for the agents. The modification includes, but is not limited to, a training activity for an identified agent. In block 1515, the drill through engine tracks information indicating whether the identified agent has completed the training activity. For example, the drill through engine can receive a lesson log that includes information about whether the identified agent has completed the training activity. In block 1520, a graphical user interface is provided that includes the schedule of the agents, including information indicating whether the agent completed or not completed the training activity.

In block 1525, the drill through engine determines whether to include a drill through option, which provides a link to obtain information indicating the root cause of the modification of the schedule. In block 1530, responsive to determining that the drill through option is to be included, the drill through engine includes the drill through option in the graphical user interface, and in block 1535, the user selects the drill through option, which obtains information indicating the root cause of the modification of the schedule. The drill through engine can further provide a link to obtain information indicating whether the agent completed or not completed the training activity.

Figure 16A:
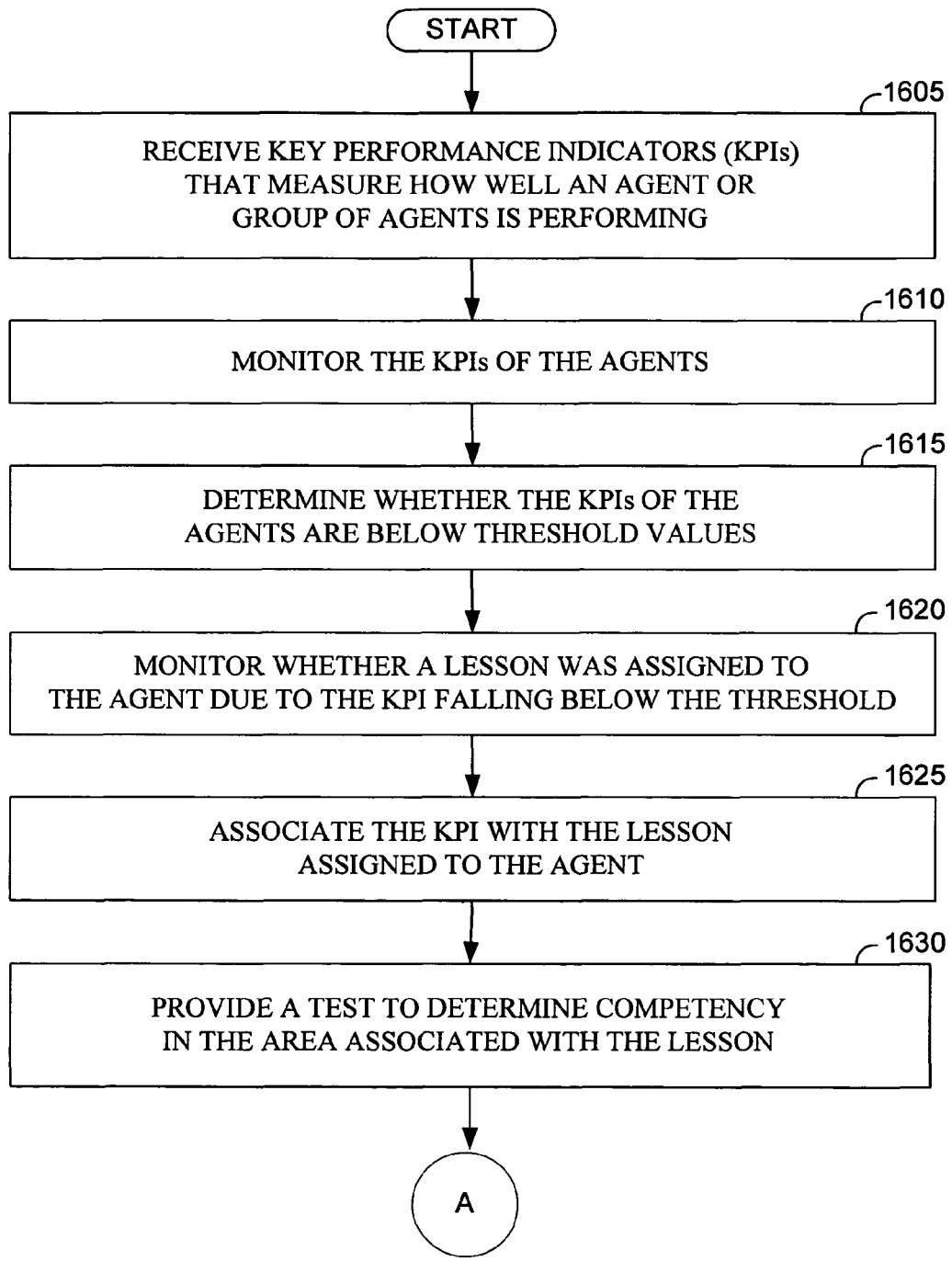
FIG. 16 is a flow diagram that illustrates operation of a drill through engine that facilitates integration between a performance manager and a learning component, such as that shown in FIG. 7.
Figure 16B:
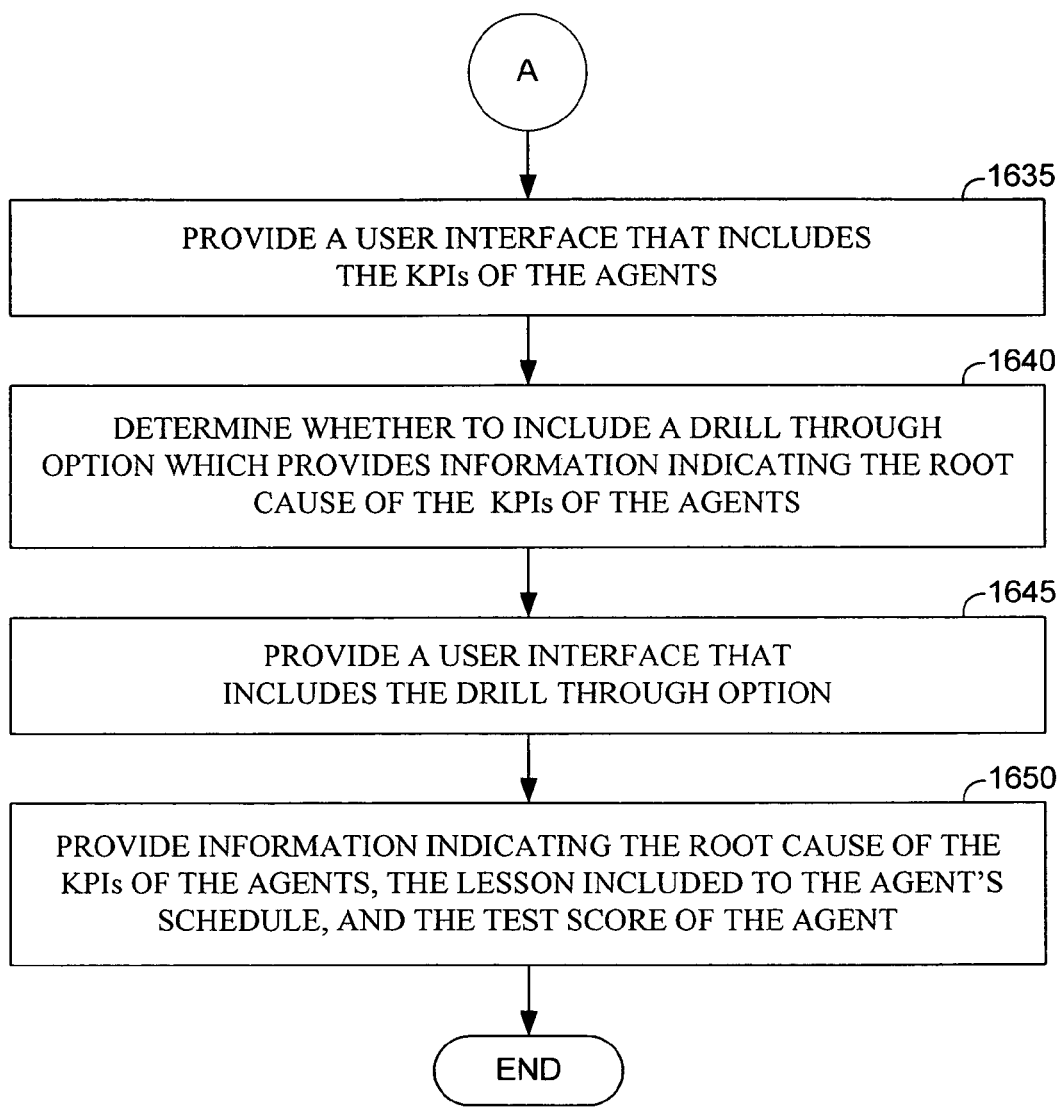

FIG. 16 is a flow diagram that illustrates an operation of a drill through engine that facilitates integration between performance manager and learning component, such as that shown in FIG. 7. Beginning with block 1605, the operation includes receiving key performance indicators (KPIs) that measure how well an agent or group of agents is performing. In block 1610, the KPIs of the agents are monitored, and in block 1615, the KPIs of the agents are determined whether they are below a predetermined threshold.

The agents can be assigned to a lesson because their KPIs fell below the predetermined threshold. In block 1620, the drill through engine monitors whether a lesson was assigned to the agent, and in block 1625, the drill through engine associates the KPIs that fell below the predetermined threshold with the lesson assigned to the agent. In block 1630, the agent can be provided with a test to determine competency in the area associated with the lesson. In block 1635, a graphical user interface is provided that includes the KPIs of the agents.

In block 1640, the drill through engine determines whether to include a drill through option, which provides a link to obtain information indicating the root cause of the KPIs of the agents. In block 1645, responsive to determining that the drill through option is to be included, the drill through engine includes the drill through option in the graphical user interface, and in block 1650, the user selects the drill through option, which provides information indicating the root cause of the modification of the schedule. The drill through engine can further provide a link to obtain information indicating the root cause of the KPIs of the agents, the lesson included to the agent's schedule, and the test score of the agent.

Figure 17:
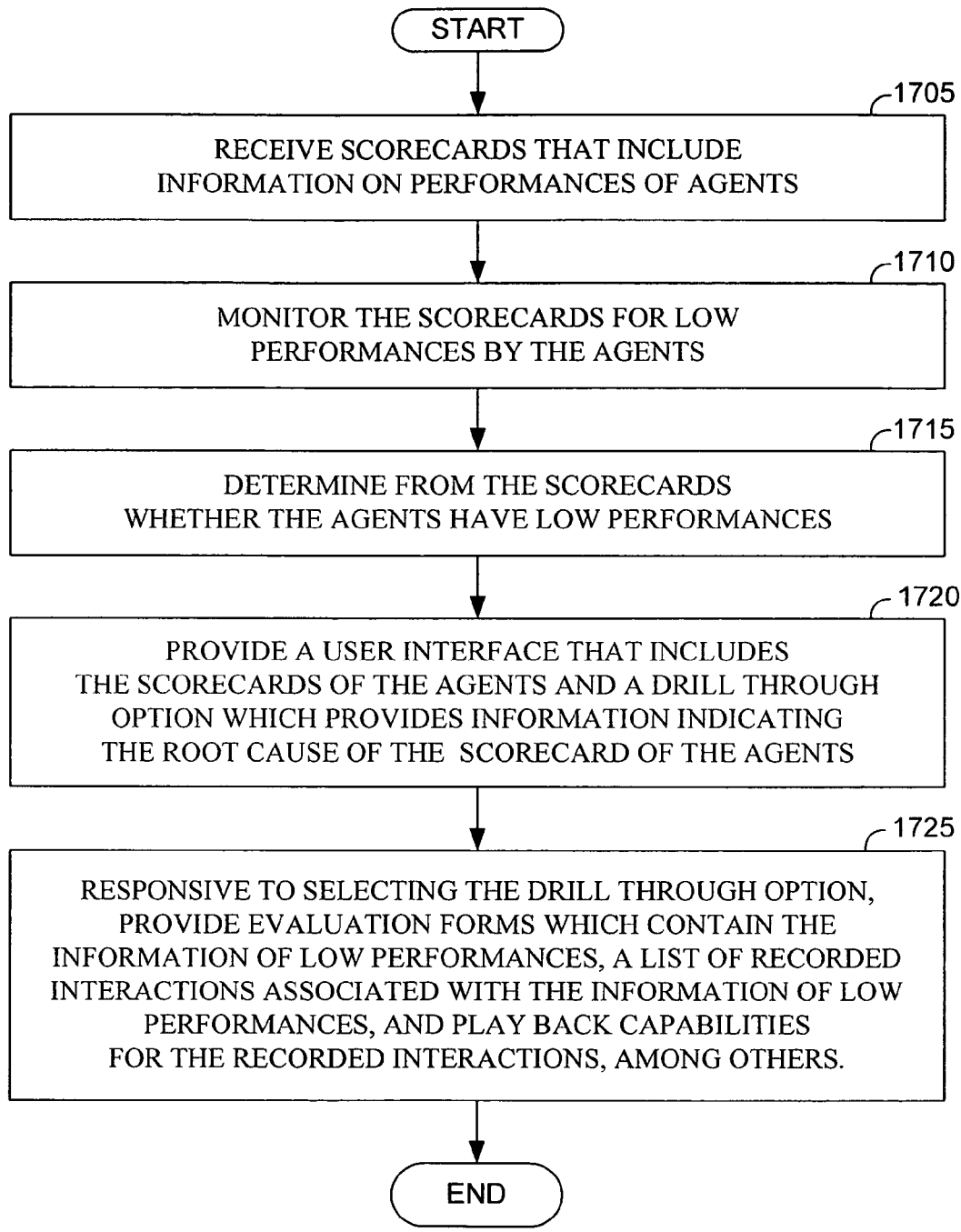
FIG. 17 is a flow diagram that illustrates operation of a drill through engine that facilitates integration between a WFM and a performance manager, such as that shown in FIG. 9.

FIG. 17 is a flow diagram that illustrates an operation of a drill through engine that facilitates integration among work force manager, performance manager and quality monitor, such as that shown in FIG. 9. Beginning with block 1705, the operation includes receiving scorecards that include information on performance of agents, and in block 1710, monitoring the scorecards for low performance by the agents. In block 1715, the drill through engine determines from the scorecards whether the agents have properly performed. In block 1720, responsive to the scorecards indicating low performance of the agents, the agents and supervisor are provided with a graphical user interface that includes the scorecards of the agents and a drill through option, which provides information indicating the root cause of the low performance of the agents. In block 1725, the user can select the drill through option, which provides evaluation forms containing information of low performance, a list of recorded interactions associated with the information of low performance, and play back capabilities to the agents and supervisors for the recorded interactions.

Figure 18:
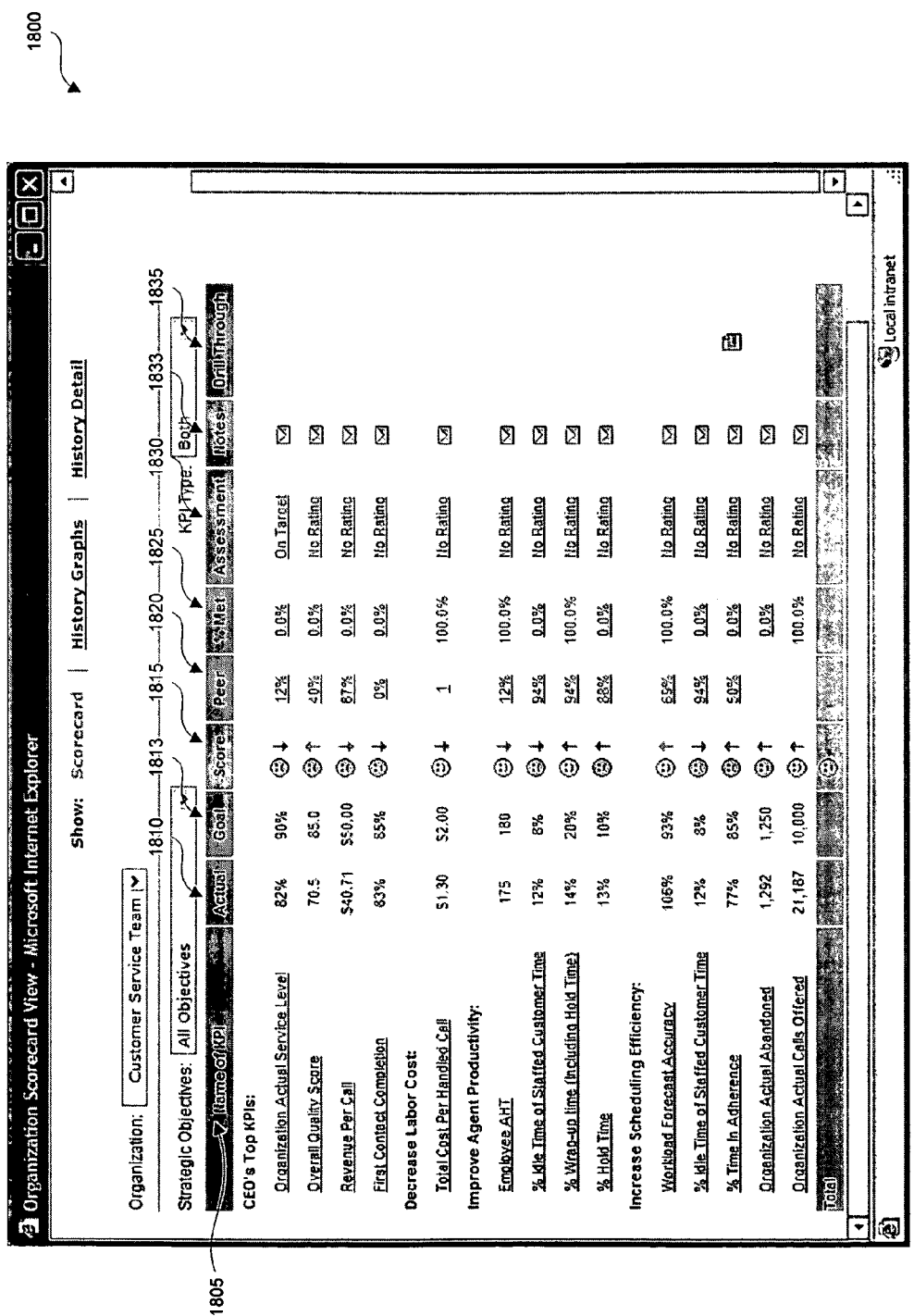
FIG. 18 is an exemplary user interface diagram for a performance manager that displays KPIs along with a drill through option.

FIG. 18 is an exemplary user interface diagram for a performance manager that displays KPIs along with a drill through option. The user interface 1800 is a scorecard screen of the performance manager 320. The scorecard screen 1800 illustrates information related to each KPI that includes an organizational score or employee score. For example, a user can select the name of a KPI 1805 and/or the score icon 1815 and view information described in the KPI and how it is used in computing an employee's score. The user can see the dates during which the employee's KPI was measured, and the scores that were recorded in those dates, including, but not limited to, scores that were recorded in dates in the past, and the employee's score in other organizations to which they belong, provided the user is authorized to review those organizations.

The names of the KPI 1805 section display links to dialog boxes, which show the details of the settings for each KPI. The actual section 1810 shows the actual value for the KPI based on each KPI's formula. The goal section 1813 shows the desired value for the KPI. The score section 1815 shows the status of each currently displayed KPI. The score can be calculated based on the gap between the actual value and the goal value. The score section 1815 further contains an arrow to indicate the performance trend, which includes an upward arrow indicating a good trend and a downward arrow indicating a bad trend.

The peer section 1820 displays the benchmark score based on the benchmark group and the calculation method in use. The percentage met section 1825 shows the selected organization the percentage of the employees that met or exceeded the goal. The value of percentage met can also be a link which, upon clicking on the link, opens a popup box that displays the names of all employees that did not meet the goals. The percentage met value can be calculated for all employees with a selected organization. The Note section 1833 displays open envelop icons for any notes that have been made for each KPI. The assessment section 1830 displays the name of assessments that have been made for each KPI. Managers can click on the phrase "No Rating" to create an assessment.

The drill through section 1835 provides a user the capability to access another page or application for more information about each KPI. For example, a drill to adherence allows a manager to analyze the reasons for a specific score on a KPI. Clicking on the drill through icon allows the user to go to the adherence page for further analysis of the root cause. In such a case, the adherence screen for the current organization's employees would be displayed for the active day of the period selected in the scorecard. That is, if a specific employee is selected on the employee's dropdown menu, the adherence screen is displayed for the employee for the first active day of the period selected in the employee scorecard. If all is selected on the employee's dropdown menu, the adherence screen is displayed for all of the selected organization's employees for the active day of the period selected in the employee's scorecard.

Figure 19:
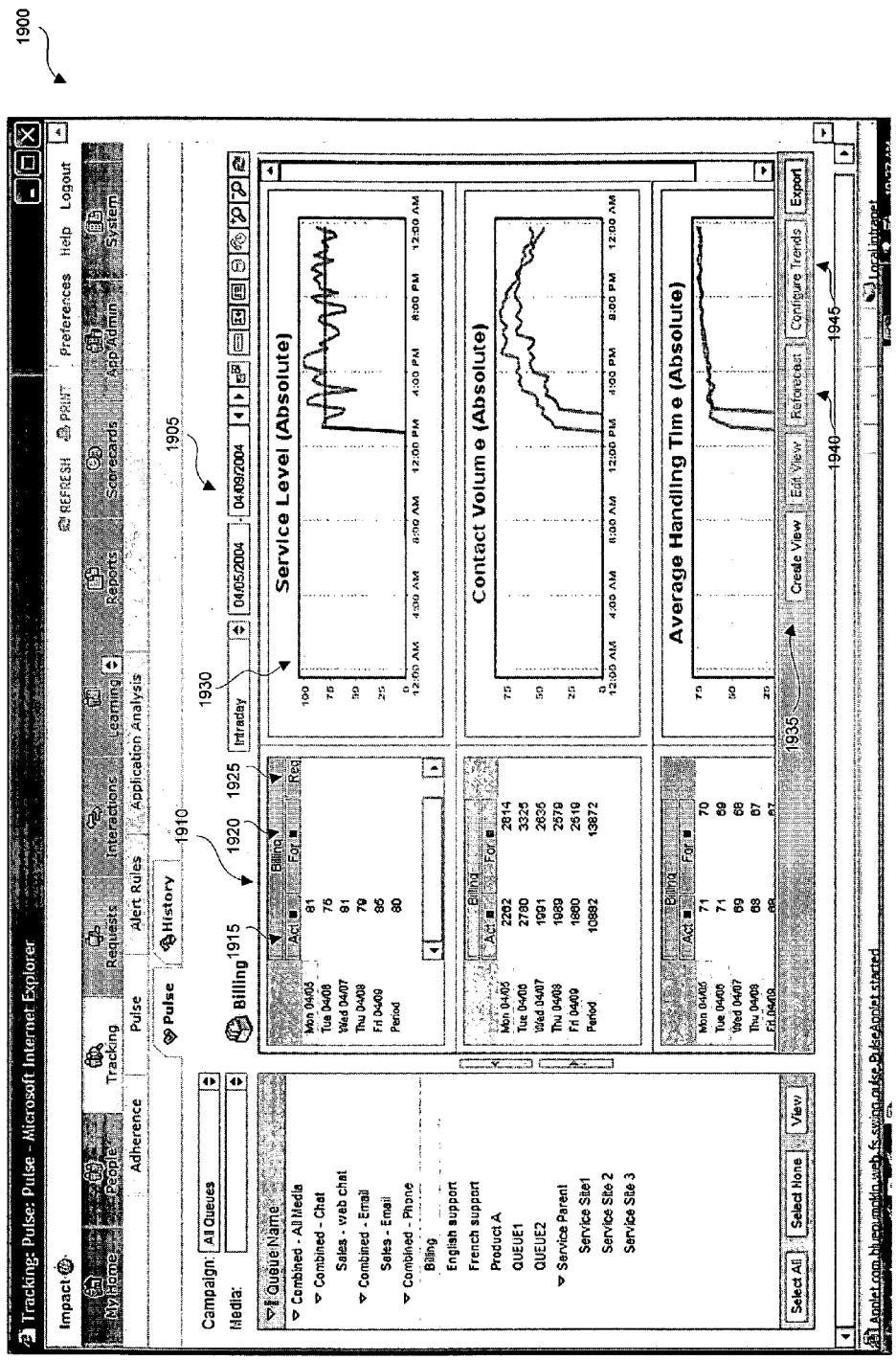
FIG. 19 is an exemplary interface for an adherence application that displays a pulse of the customer center's activities.

FIG. 19 is an exemplary interface for an adherence application that displays a pulse of the customer center's activities upon selecting the drill through icon associated with a KPI. The pulse screen 1900 is part of the WFM application in which it shows the service level, contact volume, and average handling time. The pulse screen 1900 facilitates tracking of a customer center performance. The pulse screen provides a collection of customer center data throughout the day from an ACD and compares the actual performance with forecasted and required values. This enables a user to analyze the performance of the customer center and apply corrections as needed. For example, the pulse screen can provide a queue KPI, an organization KPI illustrating queues that are related to the organization, and a person KPI illustrating queues that were assigned to the agent.

The pulse screen 1900 allows schedulers to enter historical data into the application. A date range selector 1905 specifies the date interval to be retrieved in the data panel. The specified date can be preselected upon clicking on the drill through icon of the scorecard screen, such as that shown on FIG. 18. The pulse screen 1900 further includes a summary table 1910 that displays the summary of all the days in the date range. Each data value is an aggregation of the date. The last row in the table shows the summary of the entire period. The first column 1915 of the summary table shows either a list of queues or text aggregated. The second column level 1920 shows actual value forecasted and the third column 1925 shows the required value. The graph section 1930 displays the time period on the x-axis and the statistic value on the y-axis. The name of the statistic and the calculation type are specified in the title of the graph, such as service level, contact value, and average handling time. Each queue can have approximately three lines that can indicate the actual, forecasting and required calculated values.

The bottom panel 1935 contains several controls. A reforecast control 1940 saves the current forecast including the trend as a new forecast. A configured trend control 1945 modifies the parameters that define the trend calculation. The pulse can further display information on the following statistics: average speed to answer, abandons, backlog, staffing, occupancy, and full time equivalents. The average handle time is actual data that can be imported from the ACD. The pulse screen can further list contacts on a particular queue for the intervals and select by criteria such as achieved average handle time goal and pre-filtered contacts to show specific outliers.

Figure 20:
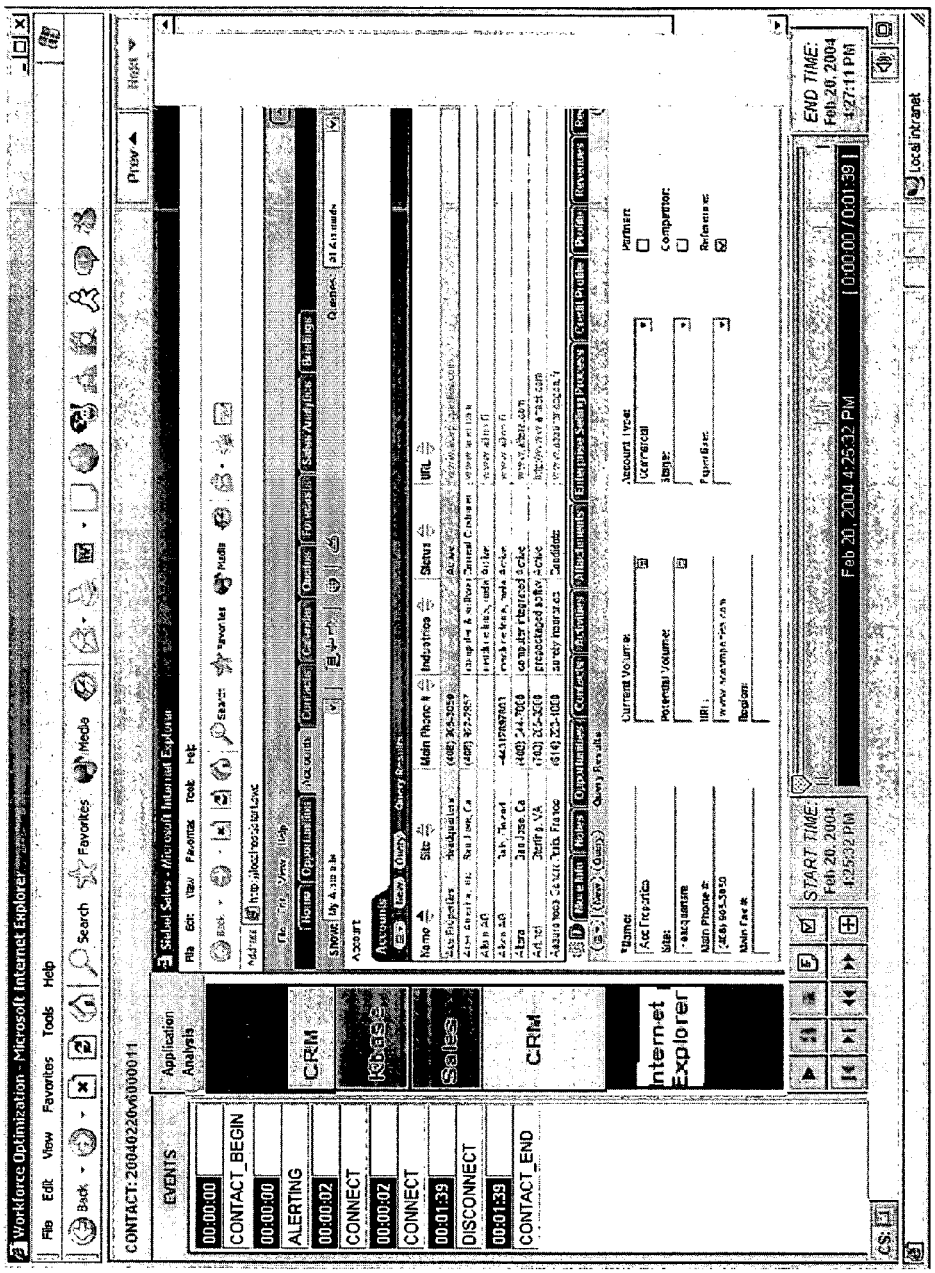
FIG. 20 shows an exemplary playback window, which is displayed after a user has selected a specific drill through option on the pulse screen, such as that shown in FIG. 19.

FIG. 20 shows an exemplary playback window, which is displayed after a user has selected a specific drill through option on the pulse screen, such as that shown in FIG. 19. The playback user interface includes a play button, pause button, stop button, rewind button, fast forward button, back to the start button, and to the end button. It also includes a start time that includes the date and time of the recording and includes the end time that includes the date and time of the end of the recording. The playback user interface further includes the name of the person being recorded, the site that the name of the person is working, the phone number or extension of the name person being recorded, among others. It should be noted that the playback cannot only playback voice recordings but also activities that occurred on a display device of a PC such as during text messaging.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variations are within the scope of this disclosure, as determined by the appended claims when interpreted in accordance with the breadth to which they are fairly and legally entitled.

Therefore, having thus described the disclosure, at least the following is claimed:

1. A method for providing information to facilitate operations at a customer center, the method comprising the steps of:

recording interactions of agents at a content recorder in accordance with predetermined business rules;

monitoring, at a quality monitoring component that includes an interaction database and the content recorder, at least one of: schedules for the agents and key performance indicators (KPIs) of the agents;

responsive to the monitoring and recording, determining, at an admistrative component executing on a computing device, whether there is a variance in any of the schedules; and responsive to the determining, determining whether to include a drill through option on a graphical user interface that includes root cause information indicating why the variance occurred to the schedule.

2. The method as defined in claim 1, further comprising:
monitoring scorecards for low performance of the agents;
responsive to the monitoring, determining whether the scorecards indicate low performance of the agents; and
responsive to the determining, determining whether to include a drill through option on the graphical user interface that includes root cause information indicating why the low performance appeared on the scorecards.

3. The method as defined in claim 2, further comprising providing the drill through option that includes a link to a second graphical user interface, the second graphical user interface being operative to provide information indicating one of the variance occurred to the schedule, and the low performance appeared on the scorecard.

4. The method as defined in claim 1, wherein the variance includes a training activity for an identified agent and the drill through option provides information indicating that the training activity has been included into a schedule.

5. The method as defined in claim 4, wherein the drill through option provides information that includes a date and time that the variance occurred.

6. The method as defined in claim 5, wherein monitoring whether the identified agent has completed the training activity is achieved by receiving a lesson log that includes information about whether the identified agent has completed the training activity.

7. The method as defined in claim 5, further comprising monitoring whether the identified agent has completed the training activity.

8. The method as defined in claim 7, wherein the drill through option provides information indicating that the identified agent has completed or not completed the training activity.

9. The method as defined in claim 1, further comprising monitoring whether a training activity was assigned to at least one agent due to the KPI falling below a threshold, the drill through option including a link to provide the monitored information.

10. The method as defined in claim 1, further comprising associating the KPI with the training activity assigned to the at least one agent, wherein the drill through option includes a link to provide the associated information.

11. The method as defined in claim 1, further comprising:
monitoring whether a test was given to the at least one agent to determine competency in the area associated with the training activity;
receiving a test score of the test; and
providing a link to the drill through option to provide information indicating whether the at least one agent passed or failed the test.

12. The method as defined in claim 1, further comprising including a link to the drill through option to provide evaluation forms which contain the indications of low performance.

13. The method as defined in claim 12, further comprising including a link to the drill through option to provide a list of recorded interactions associated with the indications of low performance.

14. The method as defined in claim 13, further comprising including a link to the drill through option to provide information providing play back capabilities for the recorded interactions.

15. The method as defined in claim 1, further comprising:
monitoring for an occurrence of an exception to agent adherence, the agent adherence being determined from agent activities at the customer center;
associating the exception with at least some of the agent activities at the customer center; and
providing a drill through option on the graphical user interface that includes a link associated with the exception, the link providing access to information indicating that the at least some of the agent activities are the root cause of the exception to the agent adherence.

16. The method as defined in claim 1, further comprising:
monitoring quality scores of the agents during the campaign based on the business rules;
determining whether the quality scores are below a quality threshold; and
responsive to the quality scores being below the quality threshold, providing a link that accesses a graphical user interface along with the quality scores, the link being operative to provide the at least some of the agent activities that cause their quality scores to fall below the quality threshold.

17. A method for providing information to facilitate operations at a customer center, the method comprising the steps of:
recording interactions of agents at a content recorder in accordance with predetermined business rules;
monitoring, at a quality monitoring component that includes an interaction database and the content recorder, for an occurrence of an exception to agent adherence, the agent adherence being determined from agent activities at the customer center, wherein the exception to agent adhernence includes a failure of the agent to adhere to a schedule;
associating the exception with at least some of the agent activities at the customer center; and
providing a link associated with the exception, the link providing access to information indicating that the at least some of the agent activities are the root cause of the exception to the agent adherence.

18. The method as defined in claim 17, wherein providing the link provides a graphical user interface that provides the information.

19. The method as defined in claim 18, wherein the link is a drill through option allowing the user to access information indicating that the at least some of the agent activities are the root cause of the exception to the agent adherence.

20. The method as defined in claim 19, wherein the graphical user interface includes a date and time that the exception occurred.

21. The method as defined in claim 17, wherein the exception to agent adherence further includes poor interaction with customers, no-showing of a training lesson, poor test scores from a training lesson, and poor attendance.

22. The method as defined in claim 17, further comprising providing the at least some of the agent activities that produced the exception to the agent adherence stored in an interaction database.

23. The method as defined in claim 22, wherein the providing the at least some of the agent activities include:
obtaining a list of the agent activities stored in the interaction database,
selecting from the list the at least some of the agent activities that produced the exception to the agent adherence, and
retrieving the agent activity from the interaction database responsive to selecting the drill through option.

24. A method for optimizing operations at a customer center, the method comprising the steps of:
receiving business rules of a campaign, the campaign including the schedule of agents;
recording interactions of agents at a content recorder in accordance with the business rules;
monitoring quality scores of the agents during the campaign at a quality monitoring component that includes an interaction database and the content recorder
determining whether the quality scores are below a quality threshold;
responsive to the quality scores being below the quality threshold, providing a link that accesses a graphical user interface along with the quality scores, the link being operative to provide the at least some of the agent activities that cause their quality scores to fall below the quality threshold;
responsive to selecting the link, providing the at least some of the agent activities that cause the quality scores to fall below the quality threshold;
associating training classes to the agents;
monitoring whether the training classes improve their quality scores; and
responsive to actuating the link, providing the quality scores after the training classes were taken.

25. The method as defined in claim 24, wherein the link accesses a second graphical user interface that provides the at least some of the agent activities.

* * * * *